(12) United States Patent
Johns

(10) Patent No.: US 8,166,811 B2
(45) Date of Patent: May 1, 2012

(54) DEVICE AND PROCESS FOR PRECISION LOADING OF PARTICLES IN A VERTICAL TUBE CHEMICAL REACTOR

(75) Inventor: Clifford L. Johns, Louisville, KY (US)

(73) Assignee: Extundo Incorporated, Louisville, KY (US)

( * ) Notice: Subject to any disclaimer, the term of this patent is extended or adjusted under 35 U.S.C. 154(b) by 731 days.

(21) Appl. No.: 12/331,477

(22) Filed: Dec. 10, 2008

(65) Prior Publication Data

US 2009/0145727 A1    Jun. 11, 2009

Related U.S. Application Data

(60) Provisional application No. 61/007,144, filed on Dec. 11, 2007.

(51) Int. Cl.
*B65G 25/00* (2006.01)

(52) U.S. Cl. ........... 73/149; 422/219; 414/287; 414/162

(58) Field of Classification Search ............... 73/149
See application file for complete search history.

(56) References Cited

U.S. PATENT DOCUMENTS

| | | | |
|---|---|---|---|
| 4,402,349 A | 9/1983 | Engert et al. | |
| 4,899,790 A * | 2/1990 | Odenthal | 141/134 |
| 5,626,455 A | 5/1997 | Keller et al. | |
| 6,640,158 B1 | 10/2003 | Brandt, Jr. | |
| 2004/0173280 A1* | 9/2004 | Huss | 141/8 |
| 2004/0191135 A1 | 9/2004 | Johns et al. | |
| 2006/0233631 A1 | 10/2006 | Diehl et al. | |

FOREIGN PATENT DOCUMENTS

WO    WO 2004/028679    4/2004

* cited by examiner

*Primary Examiner* — Hezron E Williams
*Assistant Examiner* — Nashmiya Fayyaz
(74) *Attorney, Agent, or Firm* — Camoriano and Associates; Theresa Fritz Camoriano; Guillermo Camoriano

(57) ABSTRACT

A device and method for precision loading and gentle loading of particles into vertical chemical reactor tubes in order to help ensure that the particles are not damaged while being loaded to the desired elevation.

11 Claims, 19 Drawing Sheets

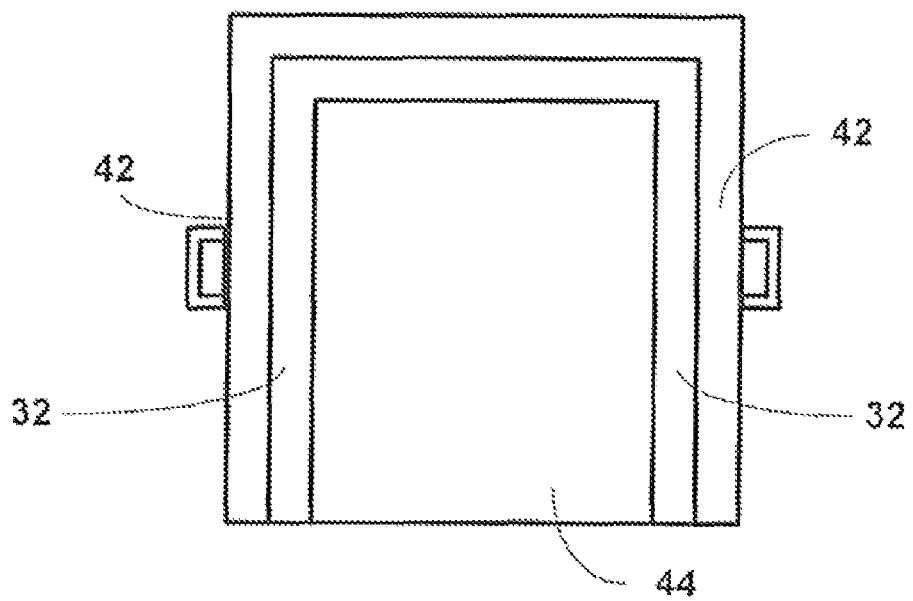
Fig. 8
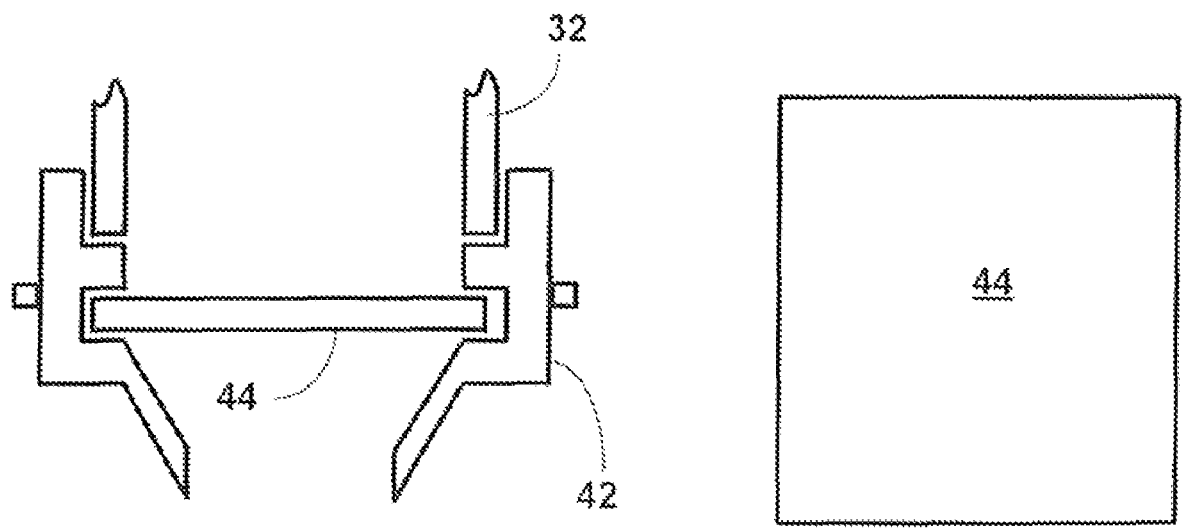
Fig. 9
Fig. 10

DEVICE AND PROCESS FOR PRECISION LOADING OF PARTICLES IN A VERTICAL TUBE CHEMICAL REACTOR

This application claims priority from U.S. Provisional Application Ser. No. 61/007,144 filed Dec. 11, 2007.

BACKGROUND

It is often important to be able to load particles, such as catalyst particles, to the correct elevation in the tubes of a vertical tube chemical reactor. This can become even more critical when the tubes require special loading, with catalyst particles at certain elevations and inert spacer particles in other specific elevations or with different types of catalyst particles at different elevations.

SUMMARY

The present invention provides an arrangement for precision loading of particles at the correct elevations within the tubes of a vertical tube chemical reactor that is accurate and treats the particles gently, avoiding damage to the particles during dispensing and measurement.

BRIEF DESCRIPTION OF THE DRAWINGS

FIG. 8 is a schematic top view of the mounting support for the bin of FIG. 2A;

FIG. 9 is a schematic front view of the mounting support of FIG. 8;

FIG. 10 is a schematic top view of the plate from FIG. 8;

DETAILED DESCRIPTION

Figure 1:
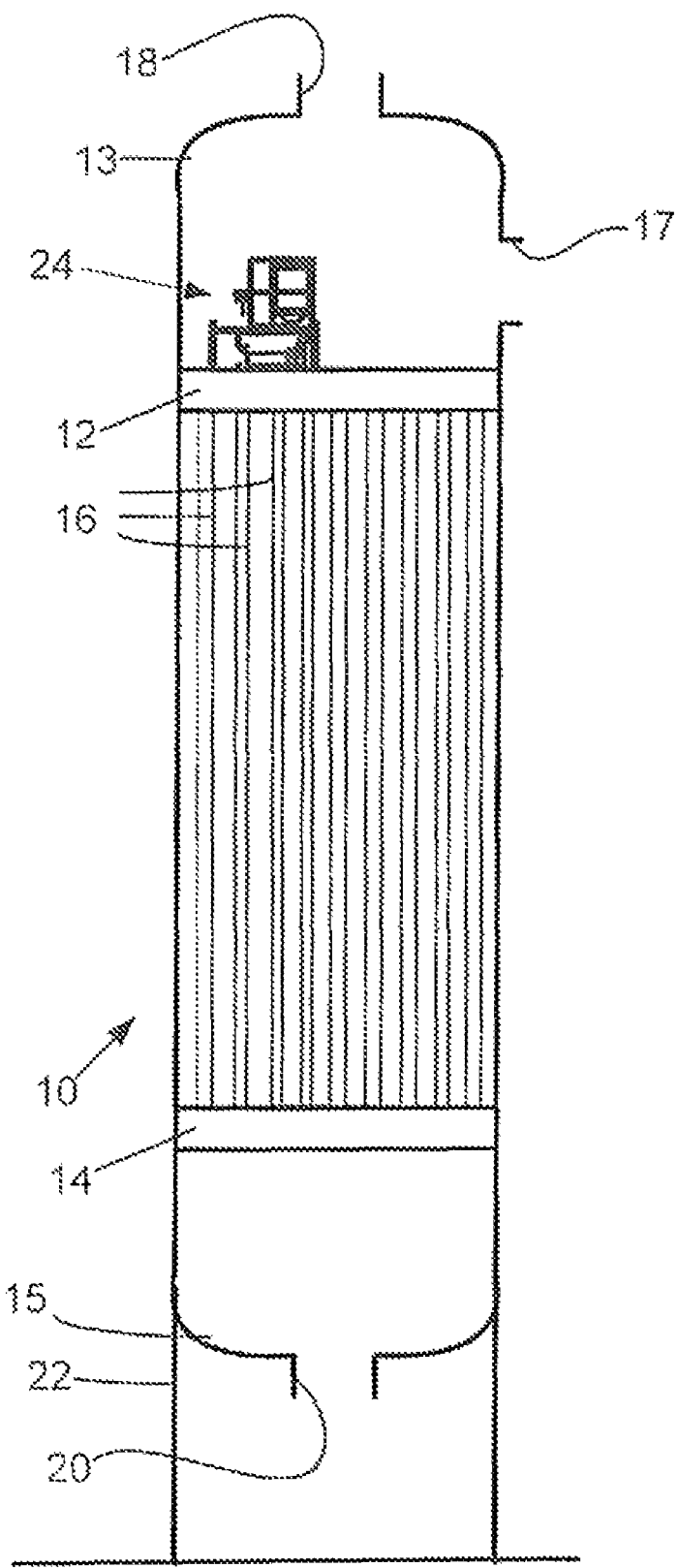
FIG. 1 is a schematic, partially broken away, section view of a chemical reactor vessel including a loading arrangement made in accordance with the present invention.

FIG. 1 depicts a typical chemical reactor vessel 10, which is a vertical shell and tube heat exchanger, having an upper tubesheet 12 and a lower tubesheet 14 with a plurality of vertical tubes 16 welded or expanded to the tubesheets 12, 14 to form a tightly packed tube bundle. There may be from one to many hundreds or even thousands of tubes 16 extending between the tubesheets 12, 14. Each tube 16 has a top end adjacent the upper tube sheet 12 and a bottom end adjacent the lower tubesheet 14. The vessel 10 includes a top dome (or top head) 13 and a bottom dome (or bottom head) 15, as well as manways 17, 18, 20 for access to the tubesheets 12, 14 inside the vessel 10. The manways are closed during operation of the reactor but are opened for access, such as during catalyst handling. In this instance, the tubes 16 are filled with catalyst particles (not shown in this view), which facilitate the chemical reaction. However, similarly-shaped shell and tube vessels may be used for other purposes, such as for a boiler or other heat exchanger, and the particles may be inert spacers or other particles besides catalyst particles.

Reactors have either fixed or removable heads. In this embodiment, the heads are fixed, and they include manways 17 and 18 at the top and 20 at the bottom.

This particular reactor vessel 10 is fairly typical. Its tubes can range in length from 5 feet to 65 feet, and it is surrounded by a structural steel skid or framework 22, which includes stairways or elevators (not shown) for access to the tubesheet elevations of the reactor vessel 10 as well as access to intermediate elevations and to a topmost elevation which may be located at or near the elevation of the top opening 18 of the reactor vessel 10. On a regular basis, which can be every 2 to 48 months or longer, as the catalyst becomes less efficient, less productive, or poisoned, it is changed out, with some or all of the old catalyst being removed and a new charge of catalyst being installed in the tubes 16 of the reactor vessel 10. Catalyst handling also can occur on an unplanned and undesirable schedule.

A catalyst change operation requires a complete shutdown of the reactor, resulting in considerable lost profits due to lost production. (The disclosed invention can be used not only for catalyst change operations but also on new reactors and tubes for their initial catalyst loading.) It is desirable to minimize the amount of time required for the catalyst change operation and yet the catalyst loading operation must be done carefully to ensure proper loading of the catalyst or other particles in the tubes 16 as these particles have a tendency to bridge and create voids inside the reactor tube if they are loaded improperly. FIG. 1 also schematically depicts an example of a particle loading arrangement 24 made in accordance with the present invention.

Figure 2A:
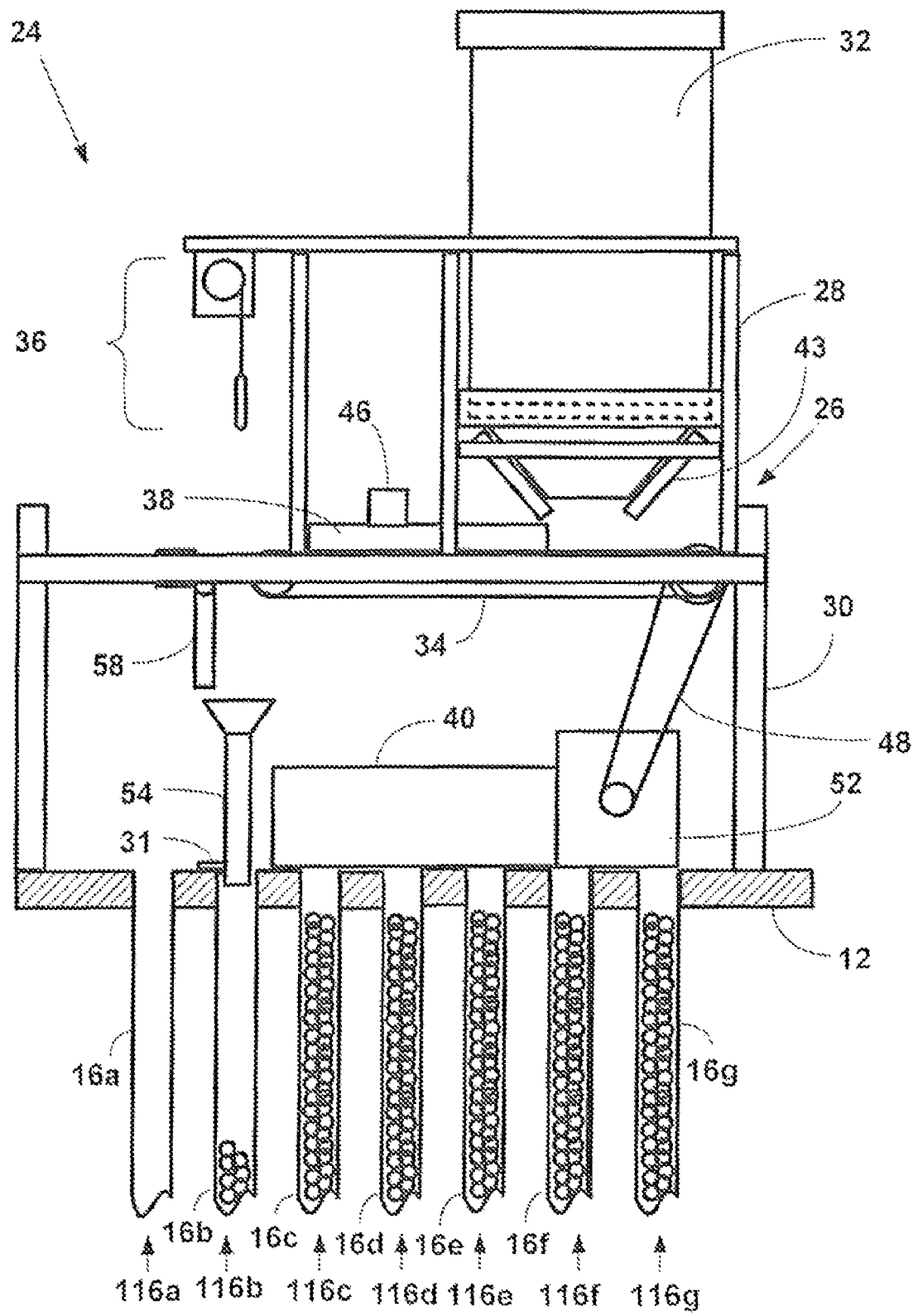
FIG. 2A is a partially broken away, side view of the loading arrangement of FIG. 1.

Referring now to FIG. 2A, this particular particle loading arrangement 24 is skid mounted on a framework 26 which can be broken down readily into subassemblies 28, 30 which can be handled easily, especially for introduction into the top head 13 via one of the manways 17, 18. In this embodiment, the framework 26 includes a top subassembly 28, which rests atop the bottom subassembly 30. These two subassemblies 28, 30 may be temporarily held together via fasteners (not shown) such that they may be moved as a unit when assembled inside the top head 13 of the reactor vessel 10. Of course, the framework 26 may include any number of subassemblies as may be desired for ease of handling and in order to fit through the manways to introduce the loading arrangement 24 into the reactor head 13.

Figure 2B:
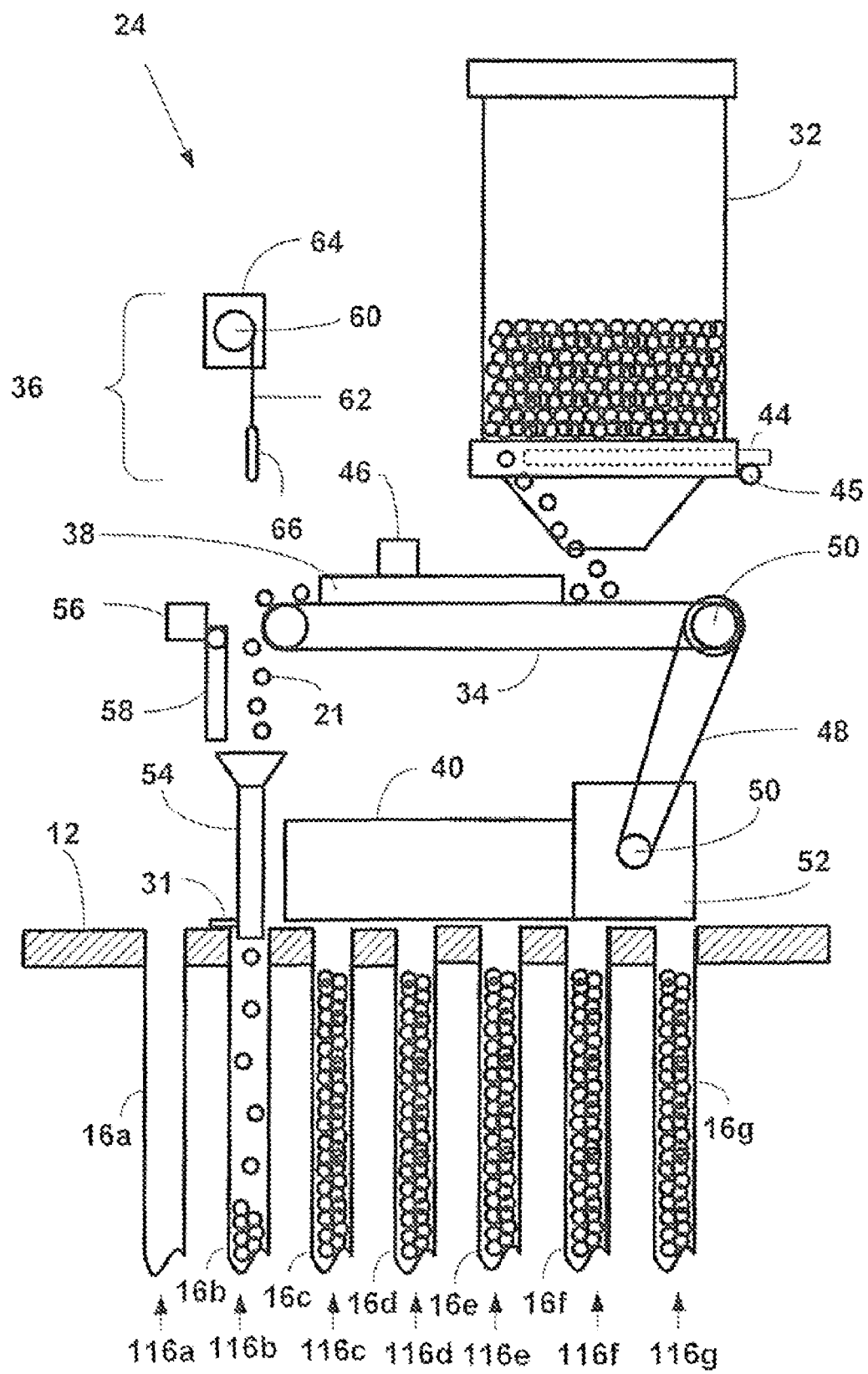
FIG. 2B is the same view as FIG. 2A, but with the framework removed for clarity.

Vertical tube chemical reactors typically have rows of reactor tubes extending between upper and lower tube sheets with the alternate rows being offset from each other so that the tubes lie on an equilateral triangular pitch. FIG. 2B is a side view, partially in section, of a particle loading arrangement 24 and shows the upper tube sheet 12 and several different tubes 16a, 16b, 16c, 16d, 16e, 16f, 16g which lie on several different respective rows 116a, 116b, 116c, 116d, 116e, 161f, 116g. This loading arrangement is intended to advance from row to row, loading several tubes within a row at a time. In this particular case, ten adjacent tubes 16c along the row 116c have just been loaded, and the device is now in the process of loading ten adjacent tubes 16b in row 116b. After these tubes 16b have been loaded, the device will advance further left to load ten of the tubes 16a in row 116a, and so forth. Thus, while FIG. 2B shows only one of the tubes 16 in each row 116, it is understood that the device actually is loading ten tubes 16 in each row as it advances from one row to the next.

Figure 6:
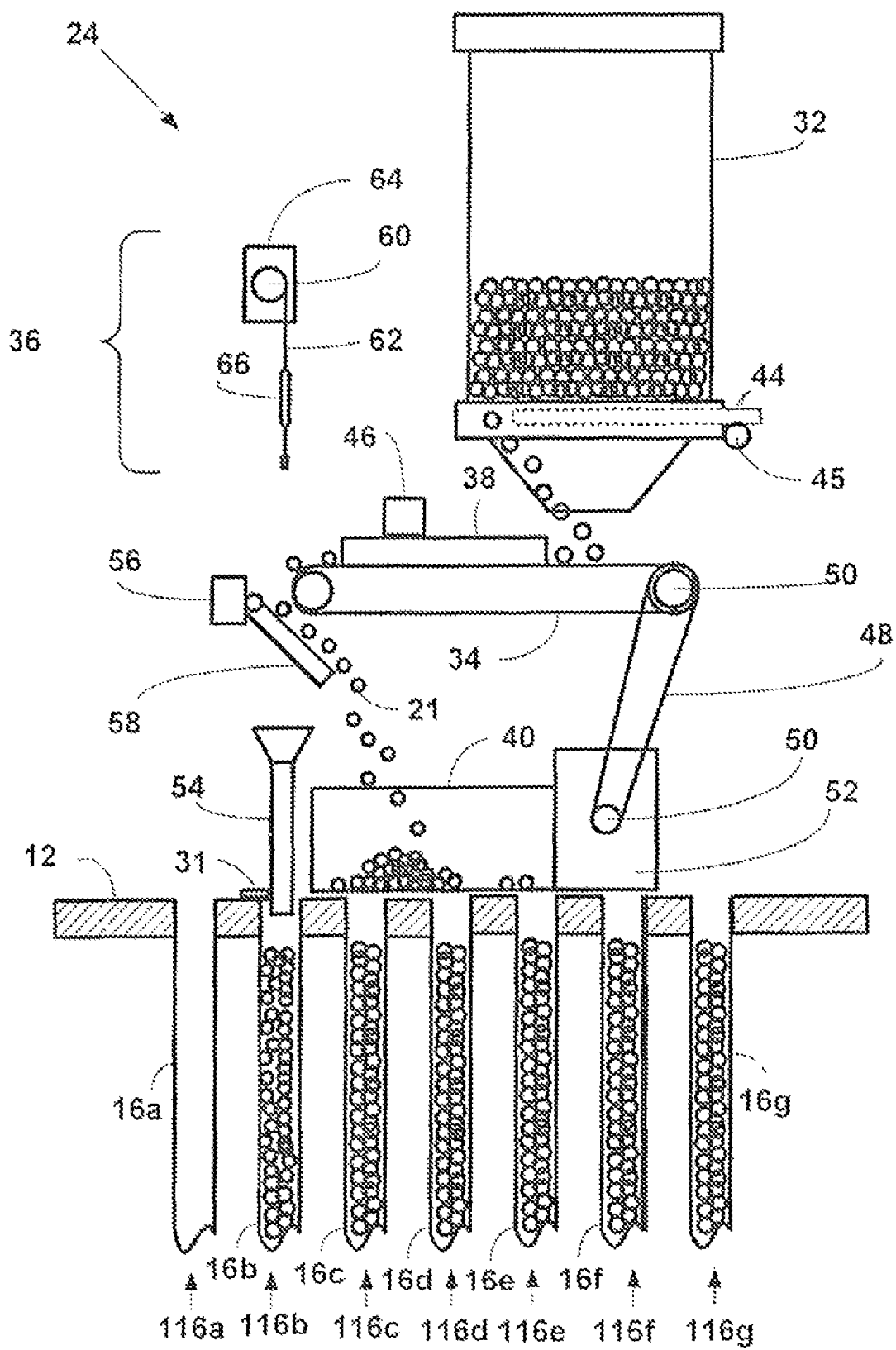
FIG. 6 is the same view as FIG. 5 but with the sensor retracted and the reactor tube fully loaded with particles.

This loading arrangement includes several components, as is best appreciated in FIG. 2B. There is a dispensing bin 32, which holds a supply of particles and dispenses them for loading into the tubes. There is a wide conveyor belt 34, which spans the distance of the ten adjacent tubes 16 and conveys the particles from the dispensing bin 32 to the ten reactor tubes 16 along a row 116. In this view, the loading arrangement 24 currently is loading ten adjacent tubes 16b in row 116b. There is a measuring system 36, which includes a plurality of sensors 66 on reels 60 to independently measure the elevation (or level) of particles 21 in each of the ten tubes 16b, and there are ten individual diverter plates 58, which divert falling particles 21 away from their respective tubes 16b and into a collection bin 40 (as depicted in FIG. 6) once the respective tube 16b has been loaded to the desired elevation.

It should also be pointed out that the particle loading arrangement 24 may be designed and installed with some of its elements being outside the dome 13 of the reactor vessel 10. For instance, the dispensing bin 32 may be mounted outside the reactor vessel 10, and the conveyor belt 34 may extend through the manway 17 and into the reactor dome 13 with the motor 52 and belt drive 48 for the belt 34 being located either inside or outside of the reactor vessel 10.

The magazine closure at the bottom of the dispensing bin 32 is shown in more detail in FIGS. 8, 9, 21, and 22. The bin 32 is open at the bottom and is secured by a strap 88 to a rail 42, which is received in a support panel 43 that is secured to the top subassembly 28, as by welding. A sliding shut-off plate 44 (See also FIG. 10) is also supported on the rail 42 and can be slid in and out, acting as a guillotine-type gate, to regulate the size of the opening through which particles fall onto the belt 34. This sliding shut-off plate 44 is shown in the closed-off position in FIGS. 2A and 5, and is shown in a partially open position in FIGS. 2B, 6, and 12-14. The position of this plate 44 is controlled by a central processor which controls a linear actuator (not shown) connected to the plate 44. A sensor 45 senses the position of the plate 44 and communicates that information to the central controller. FIG. 2B depicts the shut-off plate 44 in a partially open position to allow the flow of particles out of the dispensing bin 32 and onto the belt 34.

Stationary V-shaped divider plates 38 (Seen in FIGS. 2A and 11) are located between the dispensing bin 32 and the belt 34, either resting directly on the belt 34 or preferably being mounted at an elevation just slightly above the belt 34. These divider plates 38 are oriented substantially in the direction of travel of the belt and serve to divide the flow of particles along the belt into ten lanes, each aligned with its respective tube 16.

Figure 11:
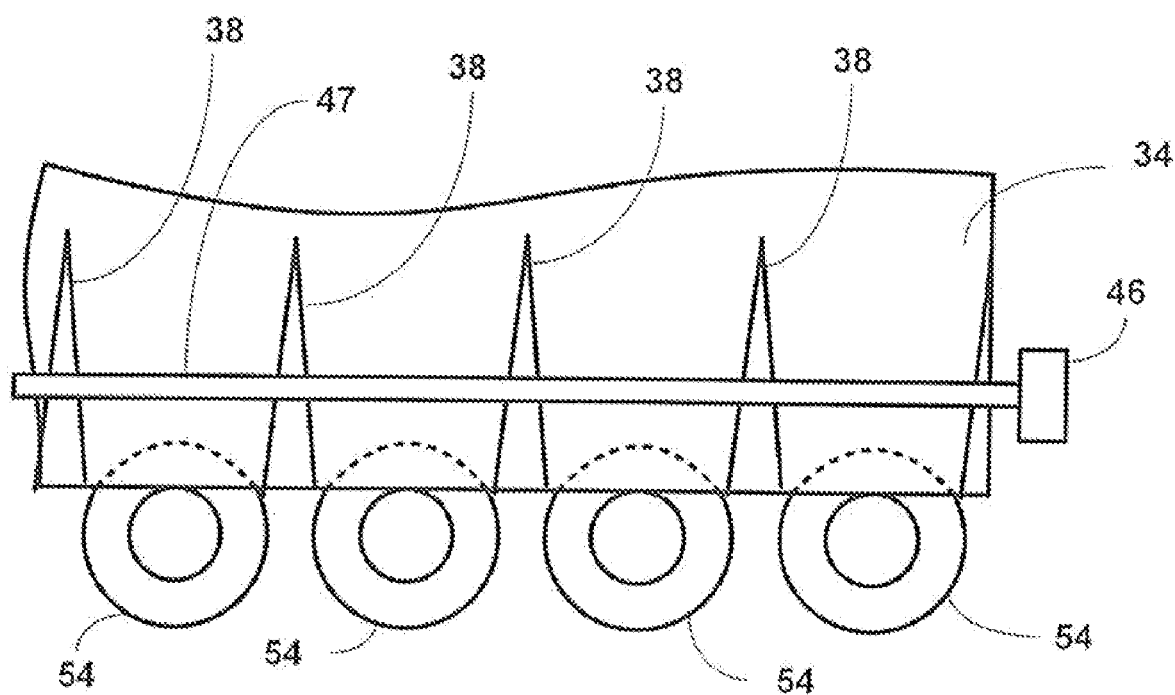
FIG. 11 is a schematic top view of the end of the belt and the funnels of the arrangement of FIG. 2B.

The divider plates 38 or other device in contact with the belt 34, such as a roller (not shown) in contact with the bottom surface of the belt 34 also may be attached to a vibratory motor 46 (Shown in FIG. 11) such as the type found in cell phones, using a rotating eccentric mass of sufficient size and vibratory force capacity to fluidize the particles on the belt to help them adequately segregate into a proper volume on the belt 34, to help ensure that the volume along the belt 34 remains substantially constant and with a consistent packing density. The vibratory motor 46 may also be attached to the top of the divider plates 38 by means of a horizontal bar, as shown in FIG. 11, and located perpendicular to them in such a manner to form a weir 47, or gate, to regulate the height and therefore the volume of particles on the belt 34. Alternatively, a separate, non-vibratory weir 47 may be used.

The conveyor belt 34 is driven by a drive roller, which is driven by a drive belt 48, which extends around pulleys 50 and is driven by a motor 52, the speed of which is controlled by the central controller.

There are ten funnels 54, one funnel 54 in each of the tubes 16b that are being loaded, and the end of the conveyor belt 34 is aligned with the openings in the funnels 54 so that the particles 21 falling off the end of the conveyor belt 34 fall into the funnels 54 and into the tubes 16b.

The funnels 54 are mounted on a movable frame 31 that is connected to the frame 30 of the loading device 24 so they can be raised and lowered together, raising them to remove them from one row of tubes 16b, for example, and then advancing the loading device 24 and then lowering the funnels 54 into the next set of tubes 16a. The movable frame 31 may be moved manually by an operator shifting a lever, or it may be moved automatically by a central processor that controls an actuator connected to both the movable frame 31 and the frame 30.

Figure 5:
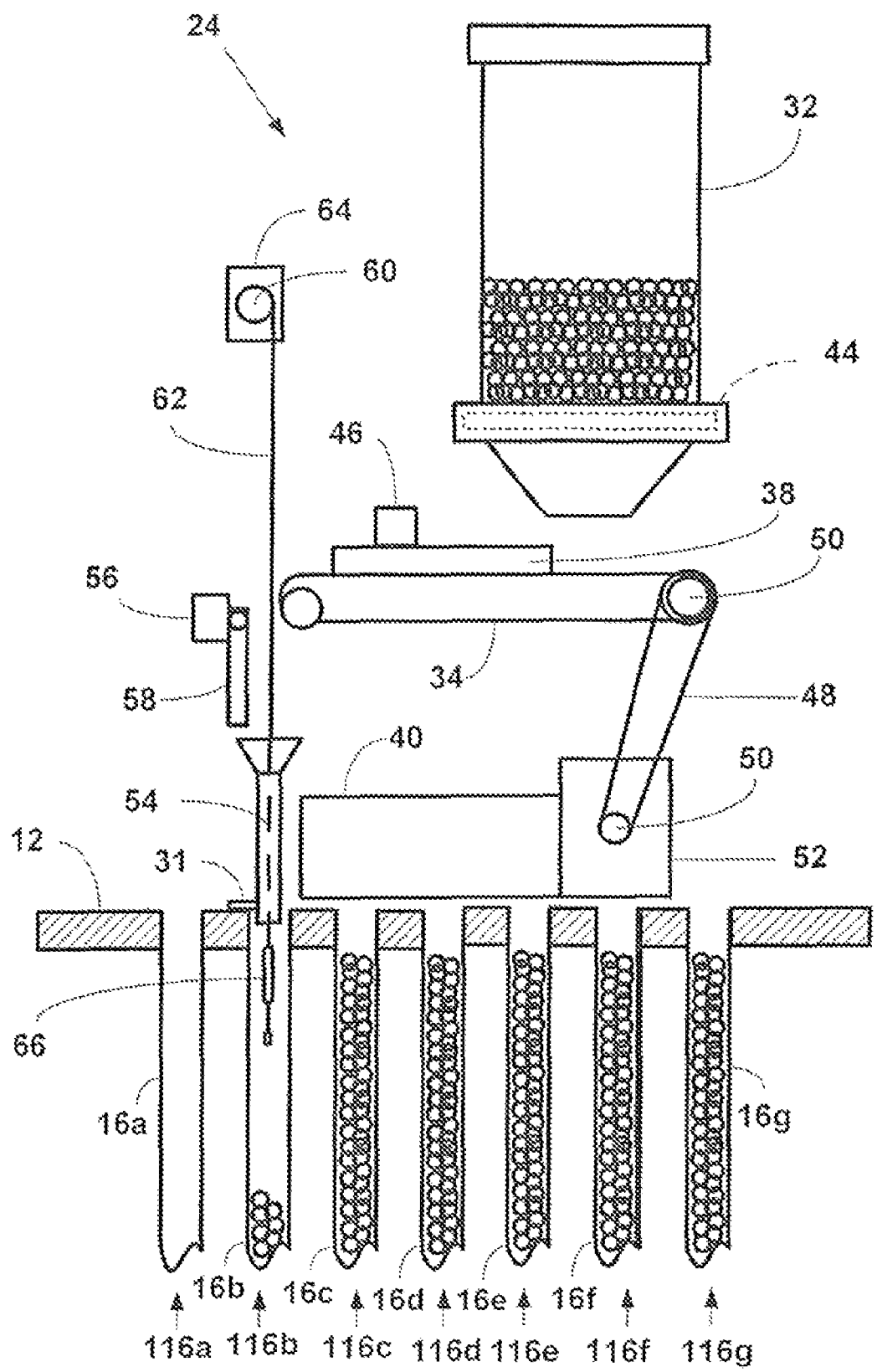
FIG. 5 is the same view as FIG. 2B but with the sensor extending into one of the reactor tubes and with the plate closing off the feed from the dispensing bin to the conveyor belt.
Figure 7:
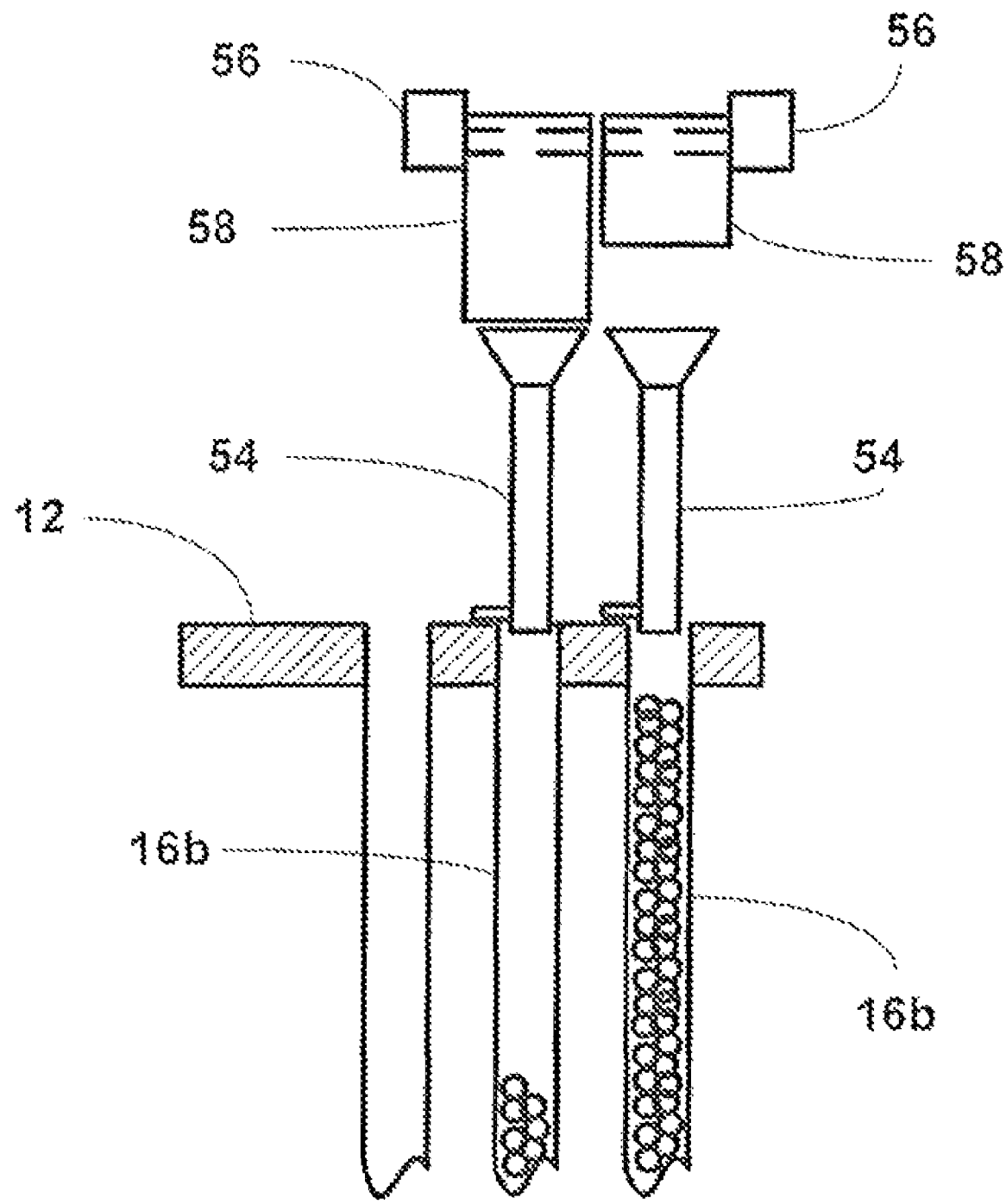
FIG. 7 is a schematic front view of the arrangement of FIG. 2B with one reactor tube full and the next adjacent tube still filling.

When it has been determined that a particular tube 16b has been filled to the desired height, or when it is otherwise desired to stop loading a particular tube, its respective actuator 56 actuates its respective diverter plate 58, pivoting the diverter plate 58 toward the conveyor belt 34 to the diverting position shown in FIG. 6, diverting the particles 21, that would otherwise fall into that tube 16b, into the collection bin 40. FIG. 7 shows two of the diverter plates 58, with the diverter plate 58 on the right side in the diverting position and the diverter plate 58 on the left in the non-diverting position. The other eight diverter plates 58 and their respective actuators 56 are not shown here, but it is understood that there is one for each tube 16b that is being filled and that each actuator 56 is independently controlled by the central controller. Once the ten tubes 16b have all been filled, the plate 44 is slid to the closed position, as shown in FIG. 5, and the conveyor belt 34 is stopped. Then the device is advanced to the next row 116*a* of tubes 16*a* to load those tubes 16*a* in the same manner.

The measuring arrangement 36 for each tube being loaded includes a reel 60, a wire cable 62, an encoder 64, and a sensor 66. The sensor 66 is shown in more detail in FIGS. 3 and 4A-4D and is explained in more detail below.

Figure 3:
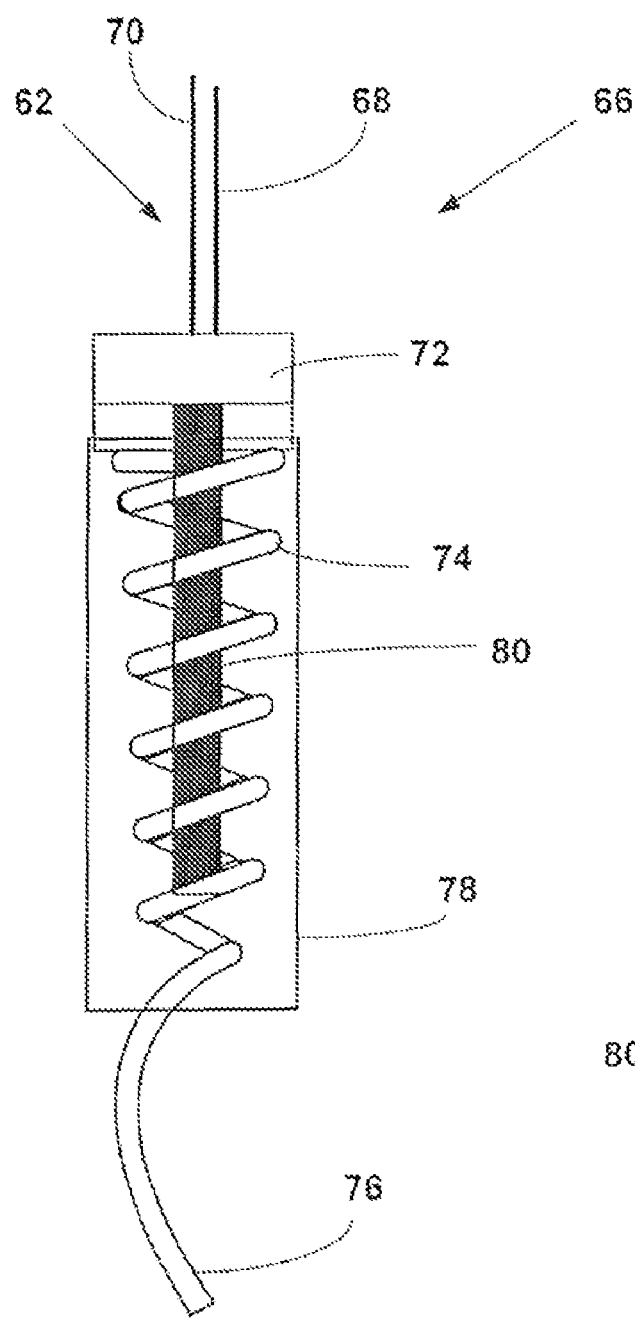
FIG. 3 is an enlarged schematic section view of a sensor from FIG. 2B.

As shown in FIG. 3, the wire cable 62 includes a ground wire 68 and a power cable 70, which support a weight 72. The ground wire 68 is electrically connected to a spring 74. The upper end of the spring 74 is suspended from the weight 72, and the lower end of the spring 74 defines a downwardly-projecting extension 76 which projects below a rubber boot 78 which partially encases the spring 74.

Figure 4C:
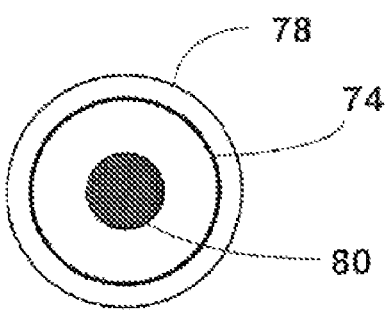
FIG. 4C is a view along line 4C-4C of FIG. 4A.

A pin 80 is electrically connected to the power cable 70, is suspended from the weight 72, and is centered inside the spiral spring 74, as shown in FIGS. 3 and 4C.

Each wire cable 62 is wound onto its respective reel 60, which is controlled by a motor including an encoder 64. This powered reel 60 is controlled by the central controller as well as being calibrated and indexed to quantify the length of wire 62 that has played out as the sensor 66 is lowered into the tube in order to know the elevation of the sensor 66 at all times.

Figure 4D:
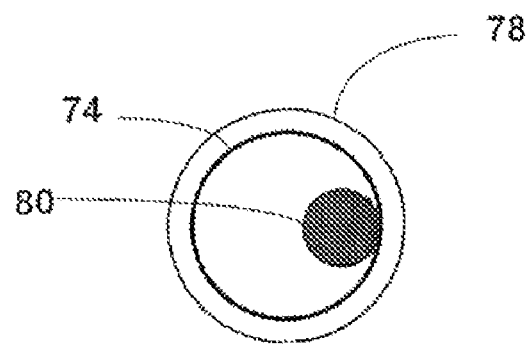
FIG. 4D is a view along line 4D-4D of FIG. 4B.
Figure 4A:
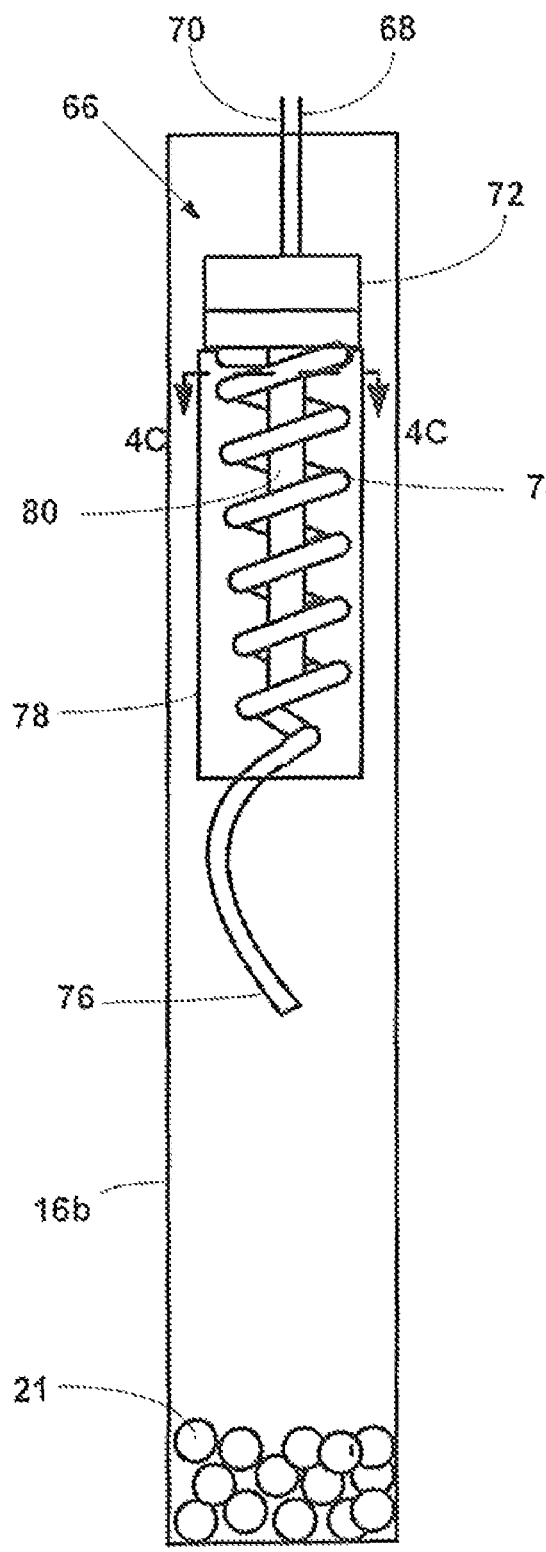
FIG. 4A is a side view of the sensor of FIG. 3 as it is being inserted into a reactor tube.

As the sensor 66 is being lowered into the reactor tube 16*b*, as shown in FIGS. 4A and 5, the pin 80 extends axially through the spring 74, and the pin 80 does not make contact with the spring 74.

Figure 4B:
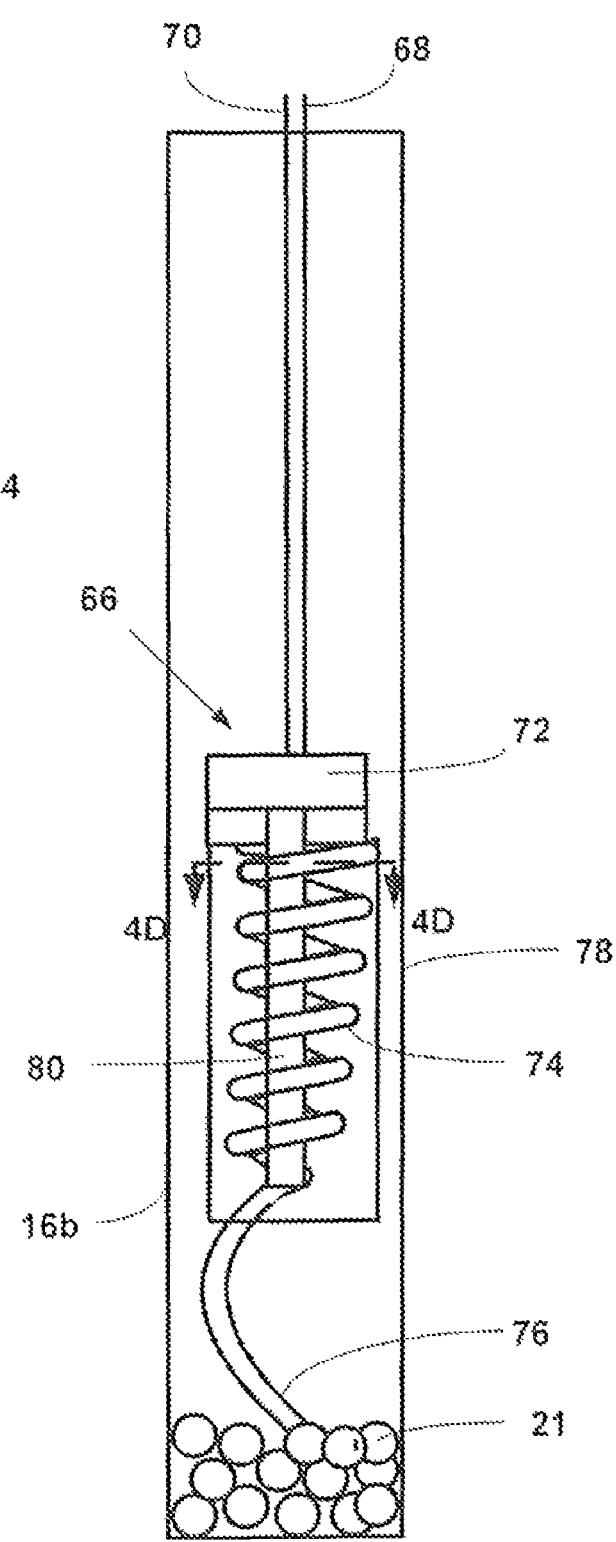
FIG. 4B is the same view as FIG. 4A but showing the sensor having made contact with the particles in the reactor tube.

As the sensor 66 is lowered further, the extension 76 of the spring 74 makes contact with the particles 21, as seen in FIG. 4B. With a slight additional downward movement of the weight 72, the extension pushes the lower portion of the spring 74 sideways, which moves the spring 74 into contact with the pin 80, as shown in FIG. 4D. This completes an electrical circuit, acting as a switch or trigger which signals that the sensor 66 has reached the level of the particles 21. The closing of this switch is registered by the encoder 64, which sends a signal to the central controller to indicate the elevation (or level) of particles 21 in that tube 16*b*.

The switch may be connected to an operational amplifier triggering circuit, not shown but well understood in the field of electronics, which serves as the input to a flip-flop circuit that can be read as a digital input/output and then reset as desired. The flip-flop circuit can be tuned to ensure that the sensor 66 has actually touched the particles 21 so as not to give false particle level indications.

Operation

In order to operate this loading arrangement 24, the dispensing bin 32 is loaded with particles 21, the funnels 54 are aligned with and inserted into the tubes 16*b* to be loaded within the row 116*b*, and a button is pushed to turn the device on to begin loading. This causes the central processor to turn on the motor 52 and slide the shut-off plate 44 outwardly, as shown in FIG. 2B, to create the desired size of opening for dispensing the particles from the bin 32. The particles 21 fall onto the conveyor belt 34, being divided into separate, substantially equal volume streams by the dividers 38 and the vibrating weir 47. The height of the weir 47 above the belt 34 preferably is adjusted to allow only a single layer of particles to continue on the belt 34 in order to help ensure a uniform density of particles 21 to permit each funnel 54 to feed its corresponding tube 16*b* without causing bridging in the tube 16*b*. Any excess particles 21 rejected by the weir 47 will fall into the collection bin 40 for later reuse.

As the particles 21 reach the end of the belt 34, they fall off the end of the belt 34 and into the funnels 54. The particles 21 then flow through the funnels 54 and into the respective tubes 16*b*.

The central controller is programmed to close the plate 44 and stop the belt 34 at a preset time before loading is completed. Preferably, the time is set to correspond with the tubes 16 being loaded approximately to 80%-90% completion. Then, the central controller causes an elevation measurement of the particles 21 to be taken in each tube 16*b* that is being loaded. In this embodiment, this measurement is accomplished by lowering a sensor 66 into each tube 16*b* being loaded. As the cable 62 plays out, the encoder 64 keeps track of how much cable 62 has played out so as to determine the exact position of the sensor 66 at all times. Once the sensor 66 makes contact with the particles 21 in the tube 16*b* (See FIG. 4B), the spring 74 is deflected until it makes contact with the pin 80 (See FIG. 4D), signaling the central processor that the sensor has reached the elevation of the particles 21 in the tube 16*b*. The central processor captures the length of cable 62 which has been played out as indicated by the encoder 64, which corresponds to an elevation of particles 21 in the tube 16*b*.

Based on the feed rate (indicated by the sensed position of the plate 44) and the time it took to reach that elevation, the processor calculates what is needed to complete the loading of the tube 16*b* to the desired target elevation. This calculation can be as simple as a calculation of how much longer the belt 34 has to run in order to complete loading that tube, or it can calculate both a new feed rate as well as an additional time based on this new feed rate. Therefore, the calculation may assume either a constant feed rate of the particles or an adjustable feed rate. In both instances, the feed rate is a controlled feed rate. It generally is preferable to maintain a constant feed rate.

Then, the central controller causes the elevation sensor 66 to be pulled out of the tube 16*b* by reversing the direction of rotation of the reel 60, and, once the elevation sensor 66 is out of the way (as shown in FIG. 2B), the central controller causes the belt 34 to begin moving again and the plate 44 to be slid open again, to resume loading particles 21. As the remaining time for each tube 16*b* elapses, the controller causes its respective actuator 56 to actuate its respective diverter plate 58 (as shown in FIG. 6), altering the particle flow path from the original path, which sent particles from the bin 32 to the tube 16*b*, to a second path, diverting those particles to the collection bin 40, which stops the loading for that tube 16*b*, while the conveyor belt 34 continues to run and one or more other tubes continue to be loaded. Once the calculated time has elapsed for all the tubes 16*b* being loaded, the central controller causes the plate 44 to be closed and the belt 34 to be stopped.

The central controller may then cause the elevation sensors 66 to be lowered again to measure the elevation of particles 21 in each tube 16*b* to ensure that the tubes are loaded to the correct elevation. If more loading is needed, the central controller may cause loading to continue for one or more tubes, as desired, with the other lanes having their diverter plates 58 actuated. Since it is easy to correct by adding particles and more difficult to correct by removing particles, this system may be deployed conservatively to avoid overloading.

The particles in the collection bin 40 may periodically be poured into the dispensing bin 32 by manually opening the lid 84, pouring in the particles, and then closing the lid 84.

Once the correct elevation of particles has been reached in all the tubes 16*b*, the central controller causes the funnels 54 to be raised. The operator then positions the loading device over the next group of tubes 16a to be loaded, the funnels 54 are lowered, and the process is repeated until all the tubes are loaded to the desired elevation.

Laser tracking of the position of the loading device 24 may be done automatically as part of the automated sequence by means of a laser measuring device mounted on the loading device 24. The laser measuring device reflects a light beam off of a reflector at a known position within the reactor vessel and the distance to the reflector is used to automatically determine the position of the loading device 24 and which tubes are being loaded. The elevation measurement data, loading times, plate position, belt speed, and other related data may be associated with and recorded for each tube in a similar manner to that in which the position and data were recorded for the tubes in U.S. Pat. No. 6,725,706, which is hereby incorporated herein by reference. This device also may transmit its data to a remote location in real time, as described in that referenced patent, and the data for each tube may be reported graphically at the remote location as described in that patent. The process described above may be repeated for each layer of particles in the tubes 16.

The device described above may be mounted on wheels, on a skid plate, or in some other manner that permits it to be supported on the upper tube sheet 12 and moved from place to place along the upper tube sheet 12. It also may have locator pins (not shown) that may be inserted into holes in the tube sheet 12 in order to help align it with the tubes to be loaded. Alternatively, the funnels 54 may be used to align the device 24 with the reactor tubes. It should be noted that, once the particle loading arrangement 24 (or any of the alternate embodiments described herein) has been aligned with a row of tubes, the operator just pushes a button (or otherwise signals the processor) to begin the sequence which will automatically run, with no further input required from the operator, until the particle loading arrangement 24 has properly filled that batch of tubes.

It should also be noted that, if for any reason a tube 16b in a row 116b is not to be loaded with particles (for instance, the tube 16b may have been permanently plugged, it may need to be hand loaded because it is a thermocouple location, or it may correspond to a tubesheet support), then the diverter plate 58 associated with that particular tube 16b may be left in the diverting position shown in FIG. 6 to divert the particles away from the tube 16b and into the collection bin 40 while the other tubes in the group are being loaded.

Alternate Embodiments

Figure 12:
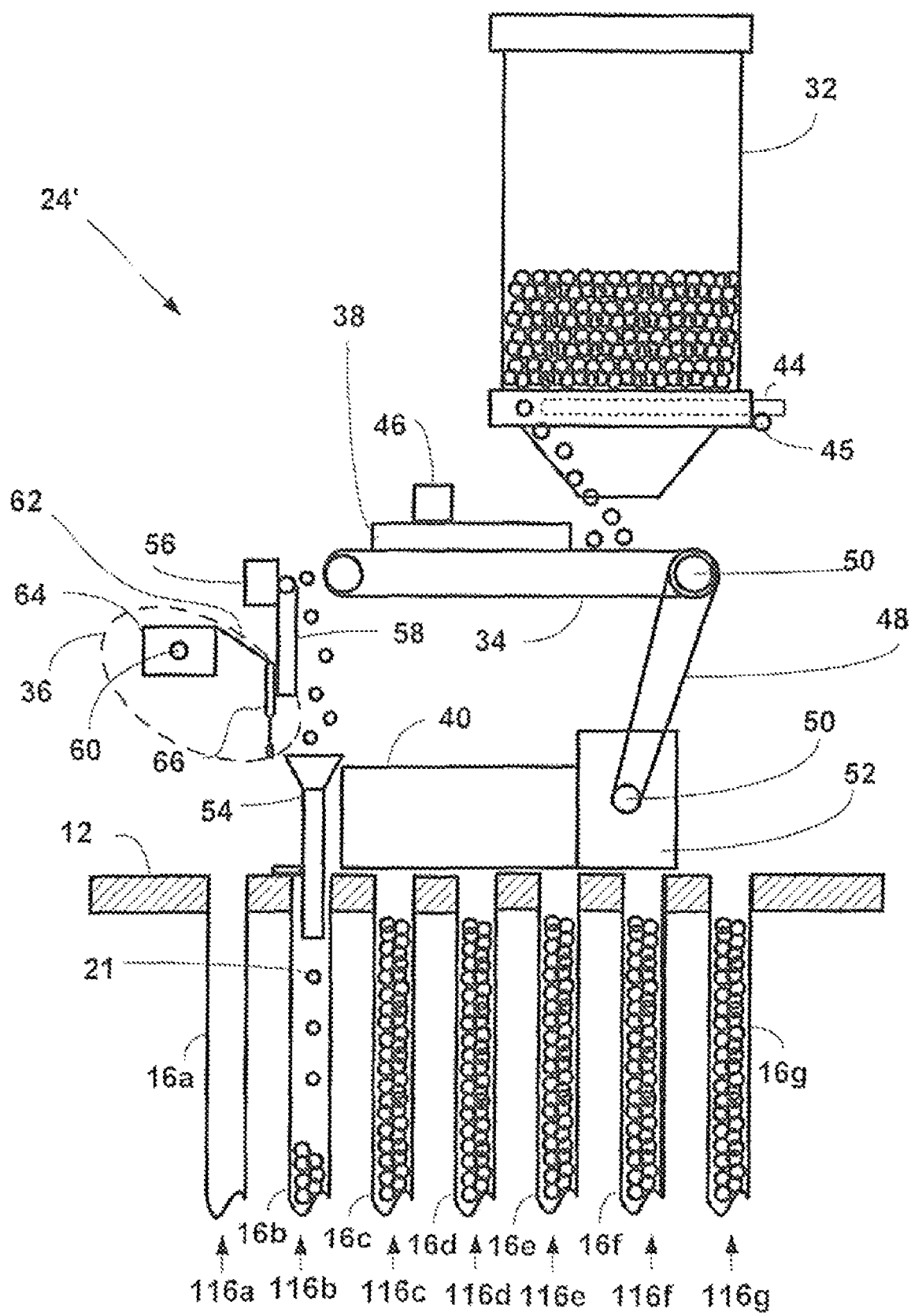
FIG. 12 is a view similar to FIG. 2B, but for a different embodiment of a loading arrangement, with the tubes being loaded with particles.
Figure 13:
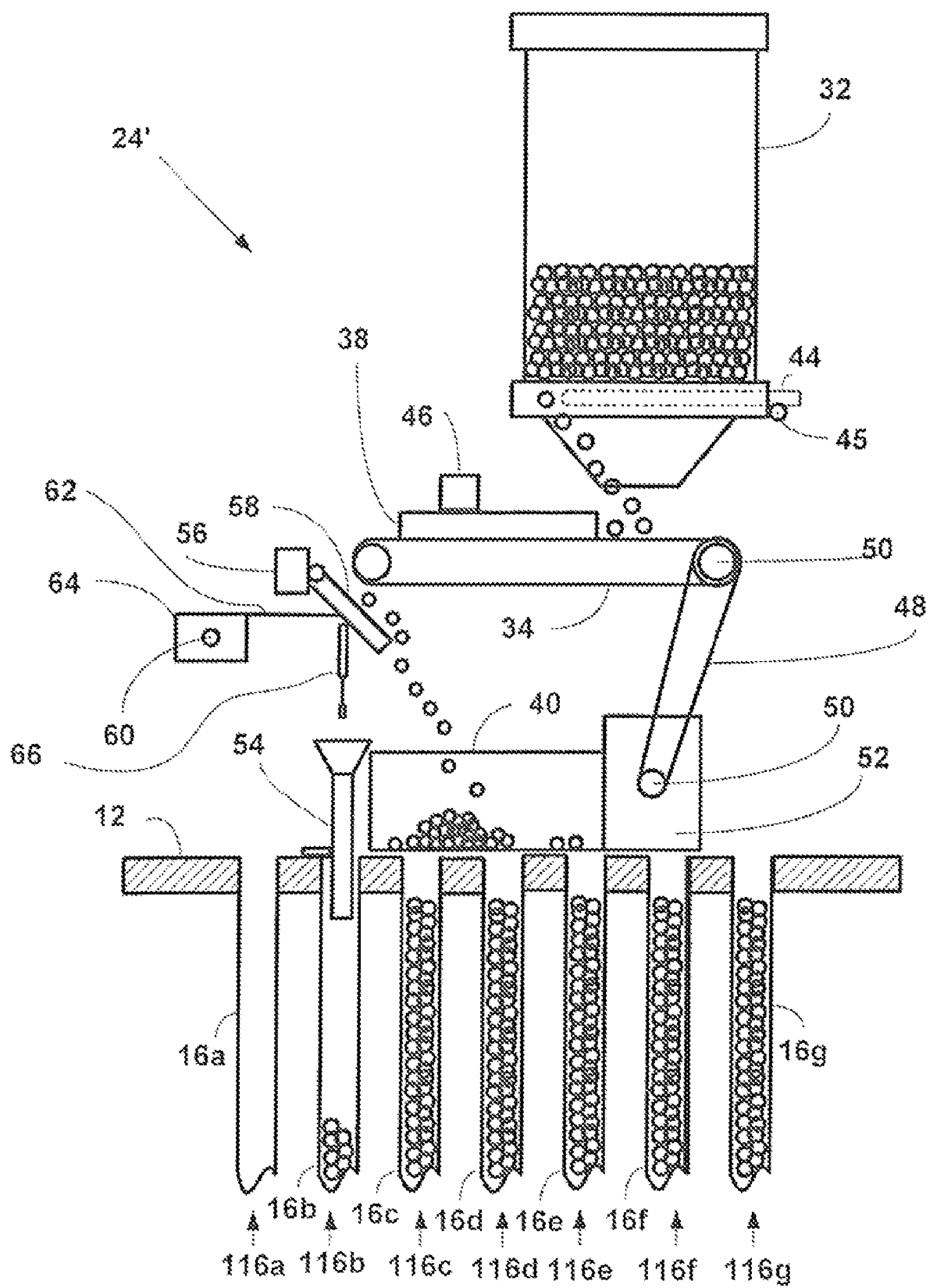
FIG. 13 is the same view as FIG. 12, but with the diverter plate sending the particles to the collection bin and the sensor in position to be deployed.
Figure 14:
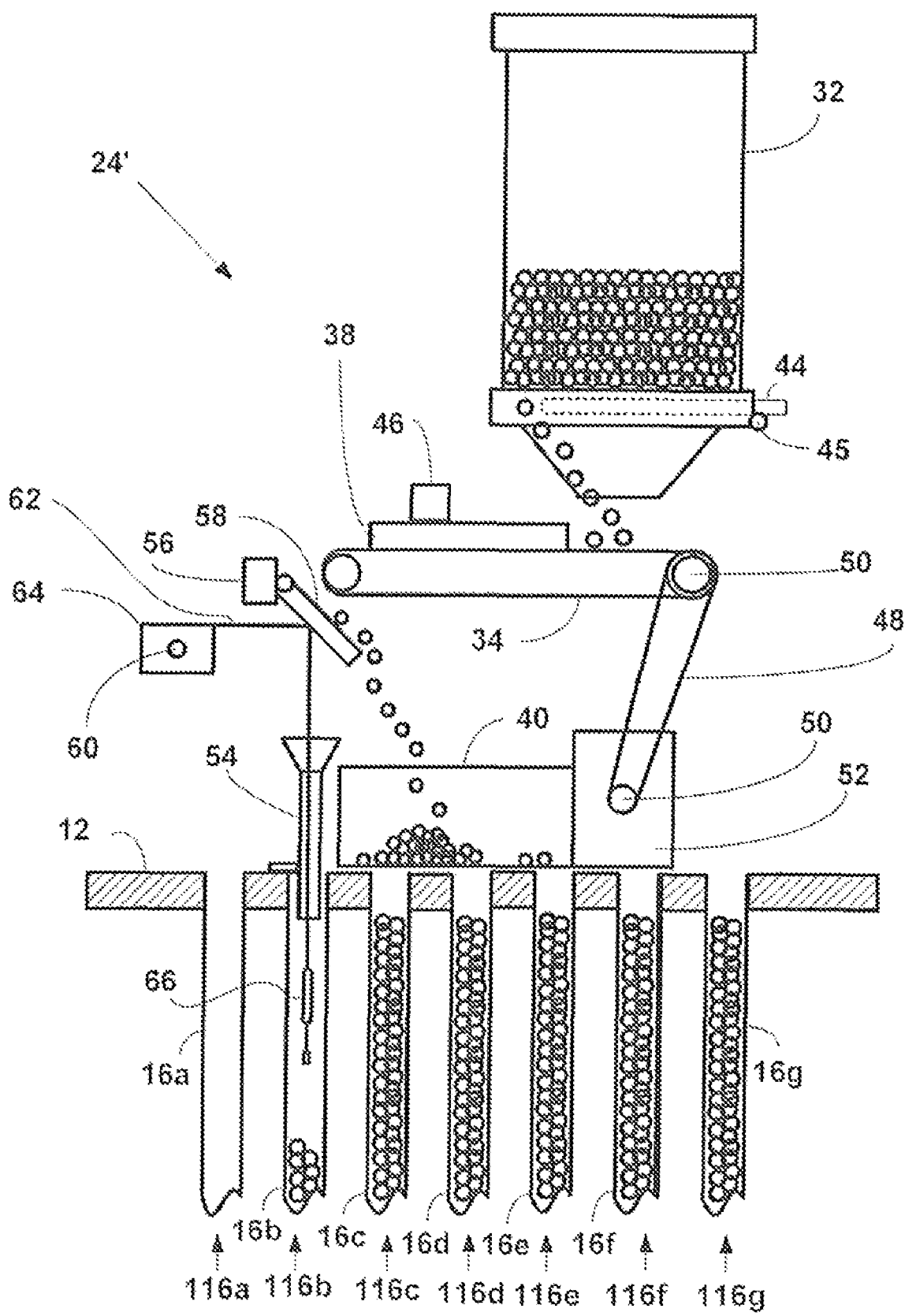
FIG. 14 is the same view as FIG. 13 but with the sensor deployed to determine the elevation of particles in the tube.

FIGS. 12, 13, and 14 depict an alternate embodiment of a particle loading arrangement 24' made in accordance with the present invention. A comparison of FIG. 12 with FIG. 2B shows that the difference is that in this embodiment the measuring system 36 has been repositioned from a position that is substantially vertically above the actuator 56 in FIG. 2B to a position that is at a lower elevation than the actuator 56 and is offset forward of the actuator 56.

This reconfiguration allows the sensor 66 to be deployed to take a reading of the particle elevation in the tube 16b being loaded without interrupting the flow of particles from the dispensing bin 32 or along the conveyor belt 34. As shown in FIG. 13, when it is desirable to check the elevation of particles 21 in the tube 16b, the controller causes the actuator 56 to move the diverter plate 58 such that the diverter plate 58 deflects the particles falling from the conveyor belt 34 away from the funnel 54 and into the collection bin 40. In this embodiment, the cable 62 that is connected to the elevation sensor 66 extends through a pulley mounted on the diverter plate 58, so that movement of the diverter plate 58 to the deflection position depicted in FIG. 13 also places the sensor 66 in a position directly above the funnel 54.

Therefore, in this embodiment of a loading arrangement 24', the flow of particles 21 from the dispensing bin 32 and the flow of particles on the conveyor belt 34 are never disrupted or changed. Instead, when it is time to take a reading of the elevation of the particles 21 in the tube 16b, the path of the particles is altered from a first path, which led from the bin 32 to the tube 16b, to a second path, which sends the particles 21 away from the tube 16b and to a collection bin 40. In this embodiment 24', this is accomplished by a diverter plate 58 which simultaneously diverts the particles 21 to the collection bin 40 and places the sensor 66 is position to be deployed into its respective tube 16b. (As will be appreciated in embodiments described later, other means may be used to alter the path of the particles 21 away from the inlet of the tube 16b.)

In FIG. 14, the elevation sensor 66 has been deployed to measure the elevation of particles 21 in the tube 16b. The shut-off plate 44 in the dispensing bin 32 is still in its open position, allowing particles 21 to continue to flow onto the conveyor belt 34. Furthermore, the particles 21 continue to flow along the conveyor belt 34, but the particles for this particular lane are now being diverted into the collection bin 40 by their respective diverter plate 58. This allows the elevation of particles 21 in the tube 16b to be measured without changing any of the settings. This helps maintain a constant feed rate of the particles 21 in the loading arrangement 24' so that, once the diverter plate 58 is returned to its non-diverting position, the particles 21 will resume being fed at the same rate as before, with no change at start-up that might occur if the belt had been stopped and started instead of just diverting the flow of particles. This also allows the elevations of different tubes to be measured at different times, as desired, while particles continue to flow along with the moving belt 34.

Operation of this Alternate Embodiment

In order to operate this loading arrangement 24', the dispensing bin 32 is loaded with particles, the funnels 54 are inserted into the tubes 16b to be loaded within the row 116b, and the motor 52 is turned on. The shut-off plate 44 is slid outwardly, as shown in FIG. 12, to create the desired size of opening for dispensing the particles from the bin 32, and the particles fall onto the conveyor belt 34, being divided into separate, substantially equal volume streams by the dividers 38 and vibrating weirs 47.

If desired, a constant flow rate of the particles 21 may first be established by diverting the particles 21 into the collection bin 40 for a period of time before beginning to load the tubes. (This could be done in other embodiments, as well, if desired.) Once a constant flow rate has been established, the diverter plates 58 are moved to their vertical, non-diverting position (as shown in FIG. 12), and the particles begin to flow into the tubes 16b.

The central controller starts a timer the instant the diverter plates 58 are shifted to the non-diverting position to allow the particles 21 to flow into the tubes 16b. After a user-determined amount of time has elapsed (estimated to be the amount of time required for the tubes 16b to be 80% to 90% loaded), the actuators 56 move the diverter plates 58 so as to divert the particles 21 into the collection bin 40, and a sensor 66 is reeled down into its respective tube at each tube location to take a measurement reading of the elevation of particles 21 in each respective tube 16b. These readings are compared with the desired setpoint elevation, and an algorithm converts the ratio (of actual reading to desired reading) into a very accurate estimate of the additional loading time required, at the constant flow rate, to reach the desired setpoint for each tube 16*b*. That is, based on the time it took to reach that elevation, the computer calculates how much longer the particles must continue to flow in order to complete loading each individual tube. Each diverter plate 58 corresponding to each tube 16*b* which is being loaded is then returned to its vertical, non-diverting position (as shown in FIG. 12) to allow particles 21 to continue to be loaded in the tube 16*b* for the calculated additional loading time required to reach the fully loaded condition.

Since, in this operating condition, the position of the shut-off plate 44 and the speed of the conveyor belt 34 remain unchanged, the particle flow rate remains constant, so the calculation as to the remaining time required to reach the setpoint (the desired elevation) for each tube 16*b* can be made very precisely, very accurately, and with a very high degree of repeatability.

As the remaining time for each tube 16*b* elapses, its respective actuator 56 actuates its respective diverter plate 58 back to the diverting position shown in FIG. 13, stopping the loading for that tube 16*b* and diverting the particles 21 for that particular tube 16*b* into the collection bin 40. At that point, the sensor 66 for that tube 16*b* may be lowered again to measure the elevation of particles in that tube to ensure that the tube is properly loaded. If additional loading is needed, the diverter plate 58 may be returned to the non-diverting position, and loading may continue for a desired period of time. Once it is confirmed that the correct elevation of particles 21 has been achieved for each tube 16*b* being loaded, the plate 44 is closed and the belt 34 is stopped.

An algorithm may be used by the central controller to compare the particle elevation of each tube 16*b* (either in the intermediate measurement or at the final measurement elevation, or both) against one or more parameters (such as the overall mean, the highest elevation, the lowest elevation, the elevation of the adjacent tubes, etc.) and, if a deviation of more than a target amount (for instance, a deviation from the overall mean of more that 5%) is detected, a warning may be raised to flag the particular tube with an out-of-range reading. For instance, an excessively low reading could indicate an "open tube" condition wherein the retaining spring at the bottom of the tube was inadvertently omitted, causing the particles to fall right through the problem tube. Likewise, an excessively high reading may indicate a partially plugged tube or a tube which has experienced a bridging of the particles as it is being loaded into the problem tube.

If the position of the shut-off plate 44 is consistently open to the same extent, and the speed of the conveyor belt 34 is also consistently set at the same speed, then the steady state flow rate should also be very consistent and repeatable as the loading arrangement 24' is moved from one row of tubes 116*b* to the next row of tubes 116*a*. In this instance, the calculations to compare the particle elevation in the tubes 16*b* may be made not only against the other tubes being loaded at the same time, but also against the tubes that were loaded previously or even against the entire population of tubes being loaded, even if other tubes are being loaded by a different loading arrangement 24' (as long as its settings of conveyor belt 34 speed and shut-off plate 44 opening are the same).

Figure 15:
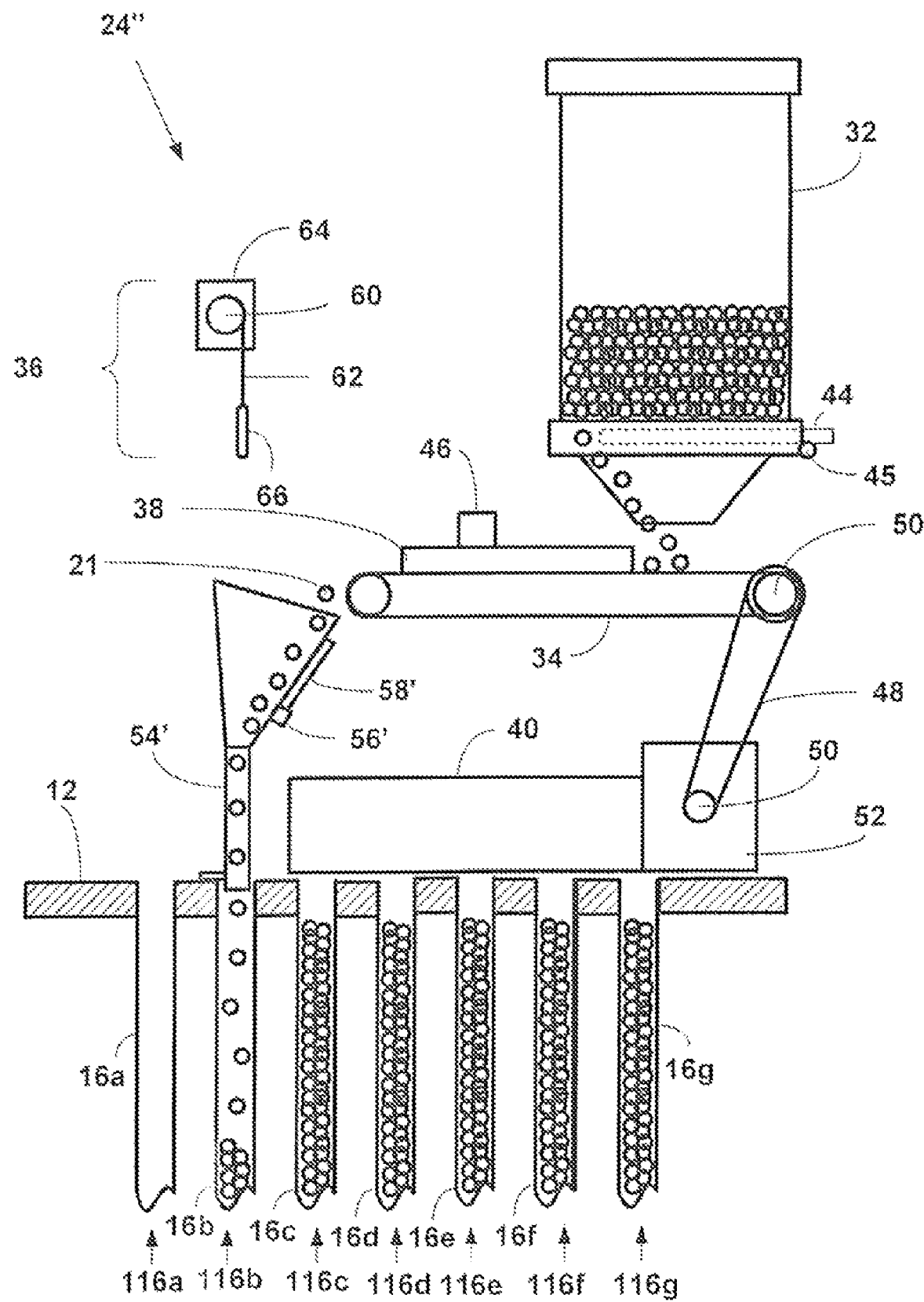
FIG. 15 is a view similar to FIG. 2B, but for a different embodiment of a loading arrangement, with the tubes being loaded with particles.
Figure 16:
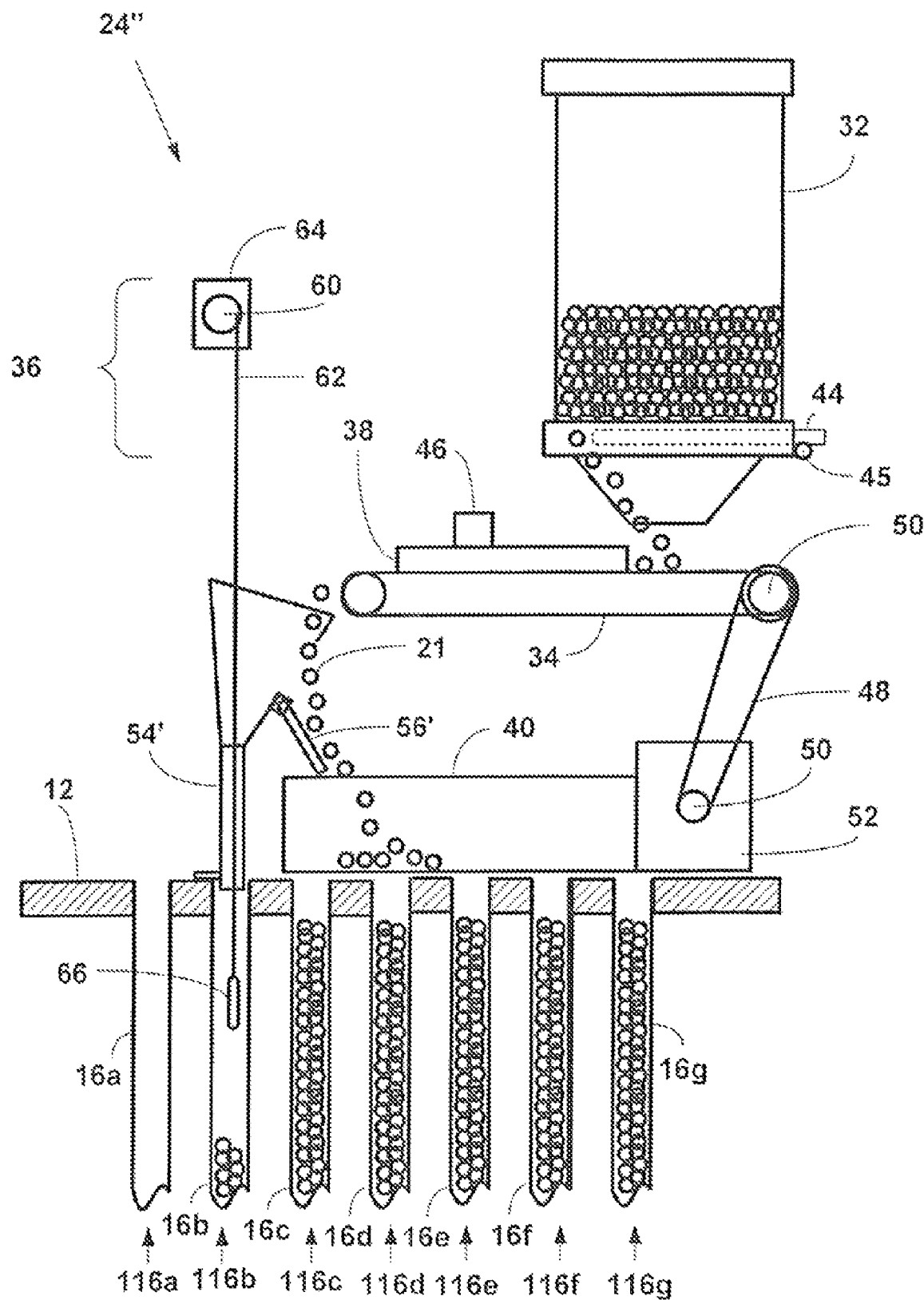
FIG. 16 is the same view as FIG. 15, but with the diverter mechanism sending the particles to the collection bin and the sensor deployed to measure the elevation of particles in the tube.

FIGS. 15 and 16 depict an alternate embodiment of a loading arrangement 24" made in accordance with the present invention. This new embodiment 24" is very similar to the embodiment 24 described earlier and depicted in FIGS. 2B and 5. The most significant difference is that the funnel 54' is much taller, reaching almost to the point where the particles 21 fall off of the conveyor belt 34. Furthermore, the funnel 54' is skewed to the right, and it incorporates the actuator 56' and the diverter plate 58' right into the funnel 54'.

The operation of this loading arrangement 24" is quite similar to that of the loading arrangement 24' described earlier, in that the shut-off plate 44 in the dispensing bin 32 and the conveyor belt 34 may continue to operate during the process of taking an elevation measurement of the particles 21 in the tube 16*b* being loaded, as depicted in FIG. 16. The path of the particles 21 is altered by opening the side of the funnel 54', in a manner similar to that of a trap door by having the actuator 56' move the diverter plate 58' to the lowered position which allows the particles 21 to fall through the opening on the side of the funnel 54' and into the collection bin 40. This clears the way for the sensor 66 to be deployed into the tube 16*b* being loaded without the particles 21 interfering with the deployment, even though the steady state flow of the particles 21 remains uninterrupted.

Figure 19:
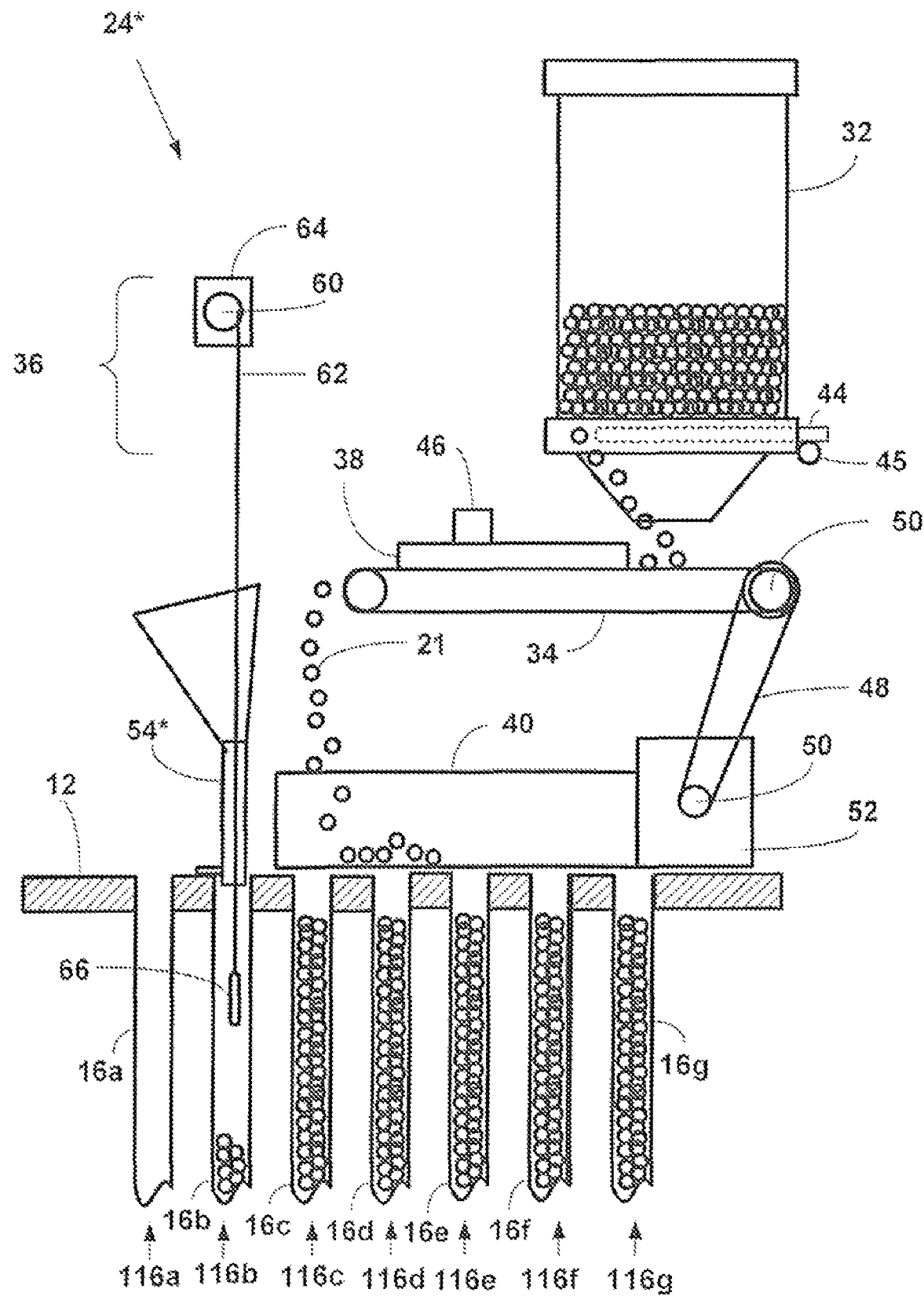
FIG. 19 is a view similar to that of FIG. 16 but for a different embodiment of a loading arrangement.

FIG. 19 depicts yet another embodiment of a loading arrangement 24* made in accordance with the present invention. This embodiment 24* is quite similar to the loading arrangement 24" disclosed above, with the most significant difference being the elimination of the actuator 56' and of the diverter plate 58'. In this embodiment 24* the funnel 54* is simply shifted such that the skewed portion of the funnel 54* faces away from the conveyor belt 34 during the process of taking a measurement of the elevation of particles 21 in the tube 16*b* being loaded. The particles 21 simply fall directly into the collection bin 40 so as not to interfere with the deployment of the sensor 66, even though the steady state flow of the particles 21 remains uninterrupted, as was the case with the loading arrangement 24".

The shifting of the skewed portion of the funnel 54* may be accomplished by any number of means. For instance, the funnel 54* may be rotated 180 degrees about its longitudinal axis to obtain the desired configuration. This could be achieved by a rotary actuator or manually. It is preferable for the movement to be automated so it can be controlled by the central controller in order for the central controller to accurately know the time period during which the tube is being filled. In another example, the conical mouth of the funnel 54* may be hinged (like an accordion-like hinge of a drinking straw) at its stem to allow the funnel 54* to shift (from the position shown in FIG. 15 to that shown in FIG. 19) without having to move its stem. The funnel 54* could then be shifted automatically, as desired, by a mechanical linkage (not shown) or even by a non-mechanical linkage (such as by a puff of air, or by magnetic attraction and repulsion).

The operation of this loading arrangement 24* is substantially the same as that for the loading arrangement 24" described earlier. The main difference is in the mechanism for altering the path of the particles 21. In this embodiment 24*, the mechanism for altering the path is simply the removal of a part of the original path to allow the particles 21 to fall directly into the collection bin 40.

Figure 17:
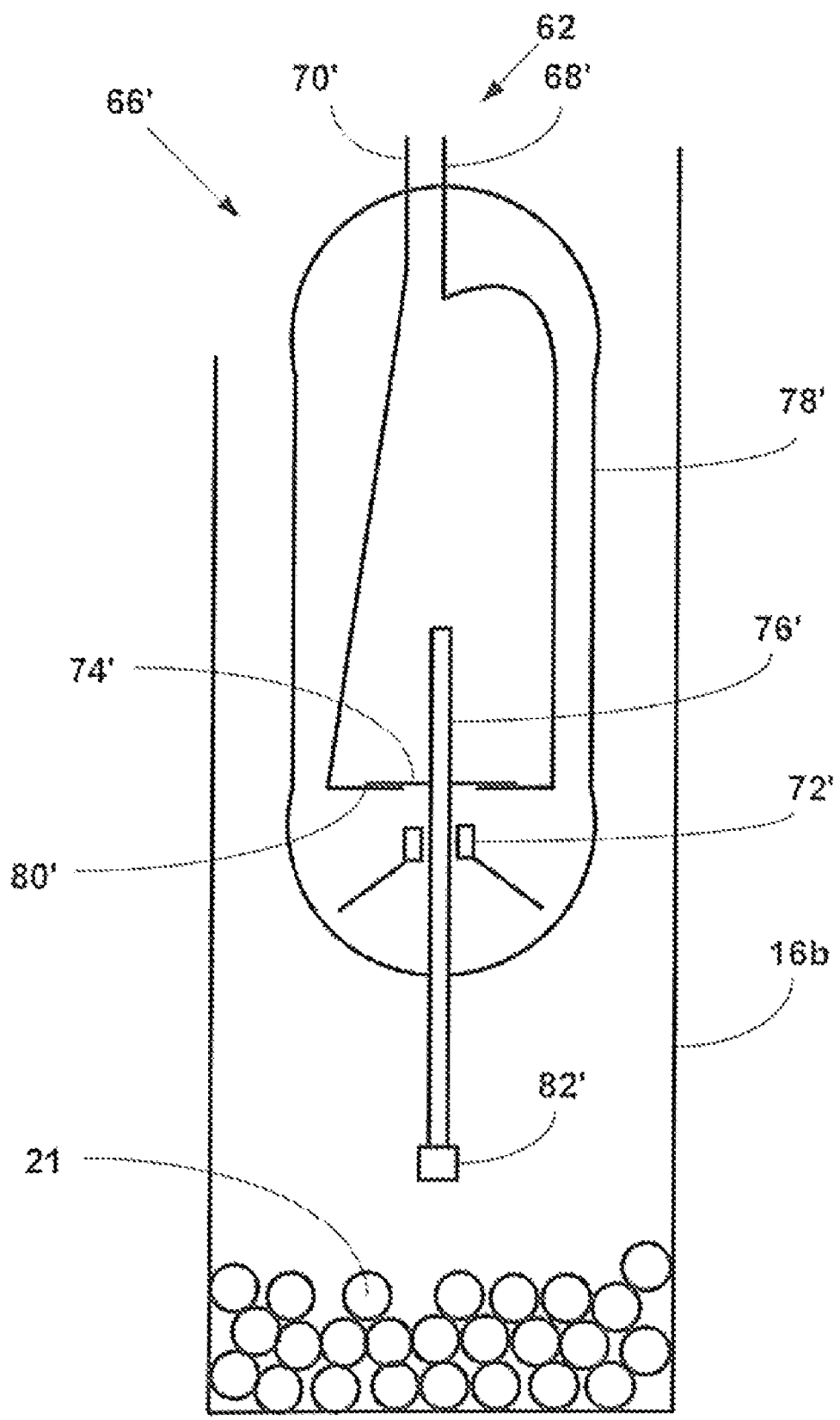
FIG. 17 is an enlarged schematic section view of an alternate embodiment of a sensor as it is inserted into a reactor tube, which may be used with any of the loading arrangements disclosed.
Figure 18:
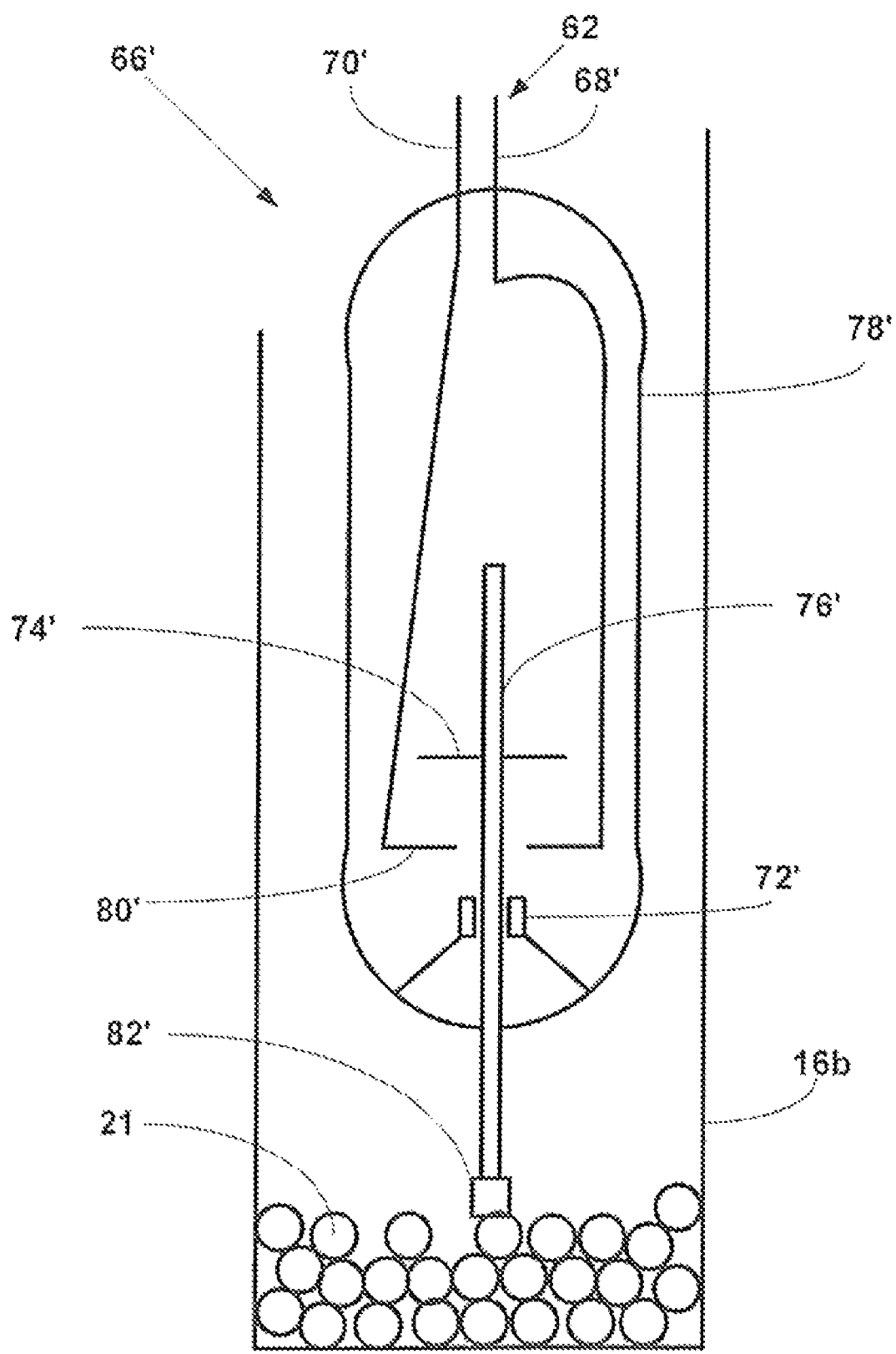
FIG. 18 is the same view as FIG. 17 but showing the sensor having made contact with the particles in the reactor tube.

FIGS. 17 and 18 depict an alternate of a sensor 66' which may be used instead of the sensor 66 described above. The wire cable 62 includes a ground 68' and a power cable 70' which support a housing 78'. A guide 72' is mounted to the housing 78' and guides a rod 76' for vertical movement relative to the housing 78'. A shorting plate 74' is mounted on the rod 76' for movement with the rod 76', and a shorting pad 80' is fixed within the housing 78'. The lowermost tip 82' of the rod 76' may be enlarged as shown to provide a larger surface for contacting the particles 21 and to provide protection for the rod 76'.

As the sensor 66' is being lowered into the reactor tube 16*b*, the rod 76' is in its lowermost position relative to the housing 78', with the shorting plate 74' resting on the shorting pad 80' to complete the circuit. When the lowermost tip 82' of the rod 76' contacts the particles 21 within the tube 16b (as shown in FIG. 18), the rod 76' moves upwardly relative to the housing 78', thereby breaking the contact between the shorting plate 74' and the shorting pad 80'. The opening of this switch is registered by the central controller. The central controller then reverses the direction of rotation of the reel 60, raising the sensor 66' until the shorting plate 74' again contacts the shorting pad 80', closing the switch and serving as a trigger responsive to the sensor contacting the particles in the tube. The position that is indicated by the encoder 64 when the switch closes is recorded and indicates the elevation of particles 21 in that tube 16b. It may therefore be seen that the operation of the measuring system 36 is substantially the same regardless of whether the sensor 66 or 66' used.

Figure 20:
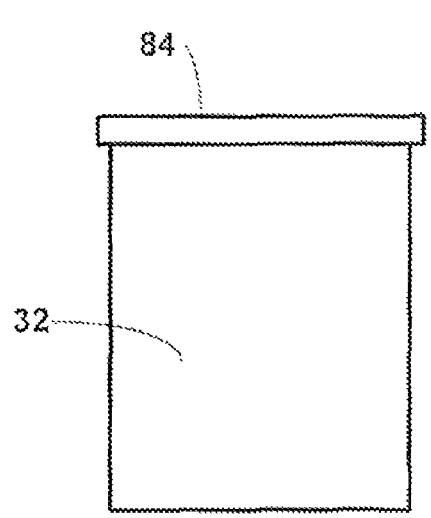
FIG. 20 is a side view of a catalyst container.
Figure 21:
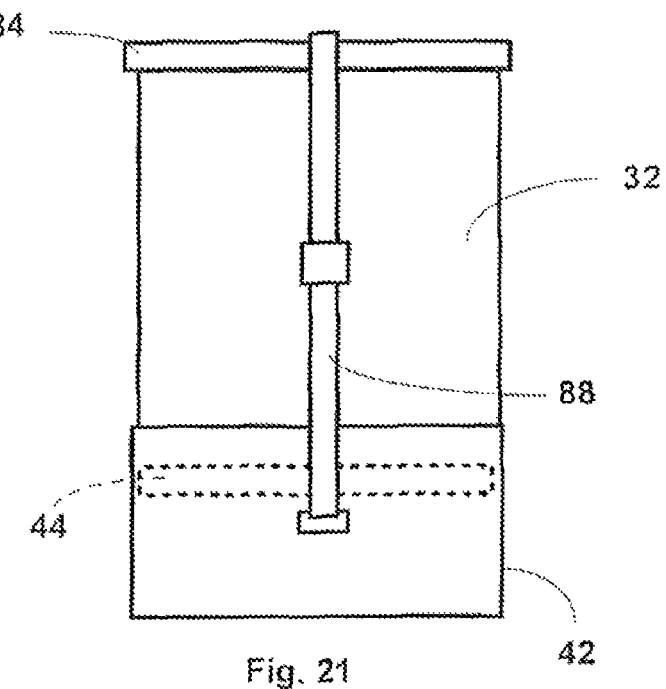
FIG. 21 is a front view of the catalyst container of FIG. 20, secured to a magazine by means of a strap.
Figure 22:
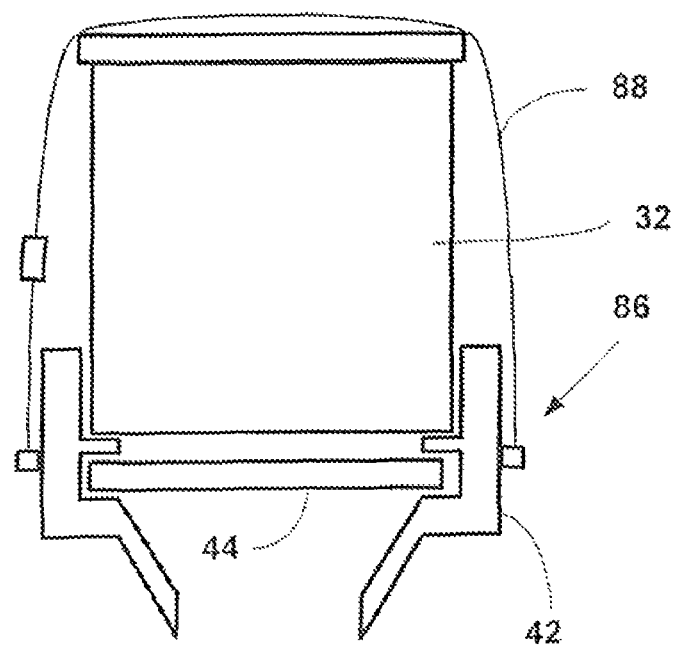
FIG. 22 is a side view of the catalyst container and magazine of FIG. 21.

FIGS. 20-22 show how the dispensing bin 32 may actually be a catalyst container, which may be provided by the catalyst manufacturer and shipped to the customer packed with catalyst. This helps minimize handling of the catalyst particles, which is desirable since the catalyst can be friable and abrasive, and unnecessary handling can result in excessive dust and fines which can undesirably restrict gas flow in a given tube as well as creating other process problems such as localized and destructive exothermic heating. In this embodiment, the container 32 is a rectangular box with a lid 84. (The container could be cylindrical or have other shapes, in which case the shapes of the mating parts would be changed accordingly.) In order to use the container 32 as a dispensing bin, it is flipped upside down and the bottom is removed, with a can opener for instance, and the magazine 86 is secured to the open end of the container 32 by means of a strap 88. The magazine 86 includes the rail 42 and the guillotine plate 44, which were described earlier.

The dispensing bin/container 32 is then flipped right side up and, with the strap 88 keeping the magazine 86 secured over the open bottom of the bin, it is lowered into magazine support panel 43, which is shown in FIG. 2A.

It will be obvious to those skilled in the art that modifications may be made to the embodiments described above without departing from the scope of the present invention. For instance, even though the description refers to taking particle elevation readings at approximately 80% to 90% of the desired final elevation, any number of intermediate particle elevation readings may be taken, and these readings may be at any desired estimated "percentage complete" elevation. Also, as was indicated earlier, some of the components of the particle loading arrangement may be installed outside the reactor vessel 10, and the collection bin 40 may be replaced by a second conveyor belt to take any diverted particles to another location, such as back into the dispensing bin or out of the reactor vessel 10.

What is claimed is:

1. A method for loading particles into vertical chemical reactor tubes supported by an upper tubesheet, comprising the steps of:
   dispensing particles onto a conveyor belt;
   driving the conveyor belt at a controlled rate;
   allowing the particles to follow a plurality of first paths from said conveyor belt into the respective inlets of a plurality of respective vertical chemical reactor tubes for a first prescribed period of time; then
   altering at least one of said plurality of first paths that had been leading to a respective one inlet of a respective one tube to form a respective second path which diverts the particles away from the respective one inlet of the respective one tube;
   continuing to drive said belt to send a portion of the particles coming from the conveyor belt along the respective second path;
   measuring the elevation of the particles in the respective one tube while diverting the particles along the respective second path;
   using the elevation measurement for the respective one tube to make a calculation of what is needed to load the respective one tube to a desired elevation; and
   altering said respective second path to resume sending particles into the respective one inlet of the respective one tube and controlling the flow rate and flow of the particles from said belt into the respective one tube for an additional time to ensure that the respective one tube is loaded to the desired elevation.

2. A method for loading particles into vertical chemical reactor tubes supported by an upper tubesheet as recited in claim 1, and further comprising the step of again altering the path away from the inlet of the respective one tube while continuing to fill a second tube from the belt along the second tube's respective first path.

3. A method for loading particles into vertical chemical reactor tubes supported by an upper tubesheet as recited in claim 2, and further comprising the steps of:
   providing a plurality of divider plates oriented substantially in the direction of travel of said belt;
   passing said belt under said plurality of divider plates to divide the particles into a plurality of lanes, each of which feeds into one of said plurality of first and second paths.

4. A method for loading particles into vertical chemical reactor tubes supported by an upper tubesheet as recited in claim 3, and further comprising the step of passing the belt under a weir to limit the height of the particles traveling along the belt.

5. A method for loading particles into vertical chemical reactor tubes supported by an upper tubesheet as recited in claim 4, and further comprising the step of vibrating said belt while driving the belt.

6. A method for loading particles into vertical chemical reactor tubes supported by an upper tubesheet as recited in claim 1, wherein said controlled rate is constant.

7. A method for loading particles into vertical chemical reactor tubes supported by an upper tubesheet as recited in claim 1, wherein said calculation to determine what is needed to load the tube to the desired elevation calculates an additional time required assuming a constant flow rate into the respective one tube.

8. A method for loading particles into vertical chemical reactor tubes supported by an upper tubesheet as recited in claim 1, and further comprising the step of adjusting said controlled rate, wherein said calculation to determine what is needed to load the tube to the desired elevation calculates an additional time required on the basis of that adjustment.

9. A method for loading particles into vertical chemical reactor tubes supported by an upper tubesheet as recited in claim 1, and further comprising the step of securing a magazine including a movable closure over an opening in a container of particles; placing the container and magazine into a support panel located at an elevation above the conveyor belt; opening the movable closure; and allowing the particles to flow from the container and through the magazine onto the belt.

10. A method for loading particles into vertical chemical reactor tubes supported by an upper tubesheet as recited in claim 9, wherein the movable closure is a guillotine plate and opening the movable closure includes sliding the guillotine plate horizontally outwardly.

11. A method for loading particles into vertical chemical reactor tubes supported by an upper tubesheet as recited in claim 1, wherein the step of measuring includes unwinding a cable from a reel to lower a sensor into the respective one tube until the sensor contacts the particles in the respective one tube and then rewinding the cable onto the reel to retract the sensor out of the respective one tube.

* * * * *